US012382468B2

(12) United States Patent
Chin et al.

(10) Patent No.: US 12,382,468 B2
(45) Date of Patent: Aug. 5, 2025

(54) METHOD AND USER EQUIPMENT FOR HANDLING A SURVIVAL TIME STATE

(71) Applicant: SHARP KABUSHIKI KAISHA, Sakai (JP)

(72) Inventors: Heng-Li Chin, Taipei (TW); Hai-Han Wang, Taipei (TW); Hsin-Hsi Tsai, Taipei (TW); Chia-Hung Wei, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 355 days.

(21) Appl. No.: 17/870,234

(22) Filed: Jul. 21, 2022

(65) Prior Publication Data

US 2023/0041119 A1 Feb. 9, 2023

Related U.S. Application Data

(60) Provisional application No. 63/260,051, filed on Aug. 6, 2021, provisional application No. 63/224,307, filed on Jul. 21, 2021.

(51) Int. Cl.
*H04W 72/23* (2023.01)
*H04L 1/08* (2006.01)
(Continued)

(52) U.S. Cl.
CPC .............. *H04W 72/23* (2023.01); *H04L 1/08* (2013.01); *H04L 1/1812* (2013.01); *H04W 72/1263* (2013.01); *H04W 80/02* (2013.01)

(58) Field of Classification Search
CPC ..... H04W 72/20; H04W 72/23; H04W 72/12; H04W 72/1263; H04W 80/02; H04L 1/08; H04L 1/18; H04L 1/1812
See application file for complete search history.

(56) References Cited

U.S. PATENT DOCUMENTS

2017/0272975 A1* 9/2017 Uchino ................. H04L 1/1848
2019/0215717 A1* 7/2019 Lee ......................... H04W 72/21
(Continued)

FOREIGN PATENT DOCUMENTS

| CN | 112929136 A | 6/2021 |
| WO | 2020024847 A1 | 2/2020 |
| WO | 2021064287 A1 | 4/2021 |

OTHER PUBLICATIONS

Nokia, Nokia Shanghai Bell, "RAN Enhancement for New QoS Parameters", R2-2105873, 3GPP TSG-RAN WG2 Meeting #114 Electronic Elbonia, May 19-May 27, 2021.
(Continued)

*Primary Examiner* — Jenee Holland
(74) *Attorney, Agent, or Firm* — ScienBiziP, P.C.

(57) ABSTRACT

A method and a user equipment (UE) for handling a survival time state are provided. The method includes: receiving a Packet Data Convergence Protocol (PDCP) configuration for indicating that a Data Radio Bearer (DRB) associated with a PDCP entity supports a survival time state functionality, the PDCP entity being associated with at least two Radio Link Control (RLC) entities; receiving an Uplink (UL) grant for retransmission of a Medium Access Control (MAC) Protocol Data Unit (PDU), the MAC PDU including data from the DRB; entering the survival time state for the DRB upon receiving the UL grant; and activating a PDCP duplication for the PDCP entity during the survival time state.

10 Claims, 8 Drawing Sheets

(51) Int. Cl.
*H04L 1/1812* (2023.01)
*H04L 1/1867* (2023.01)
*H04W 72/1263* (2023.01)
*H04W 76/15* (2018.01)
*H04W 76/27* (2018.01)
*H04W 80/02* (2009.01)

(56) References Cited

U.S. PATENT DOCUMENTS

| | | | | |
|---|---|---|---|---|
| 2020/0107370 | A1* | 4/2020 | Wei | H04L 1/1812 |
| 2020/0236579 | A1* | 7/2020 | Cho | H04W 24/10 |
| 2020/0274654 | A1* | 8/2020 | Loehr | H04W 72/23 |
| 2021/0144743 | A1* | 5/2021 | Rastegardoost | H04W 72/23 |
| 2021/0235399 | A1* | 7/2021 | Wich | H04W 28/0268 |
| 2022/0086861 | A1* | 3/2022 | Zhao | H04L 1/188 |
| 2022/0132502 | A1* | 4/2022 | Sun | H04W 72/0453 |
| 2022/0159100 | A1* | 5/2022 | Xu | H04L 63/0428 |
| 2022/0182185 | A1* | 6/2022 | Bostrom | H04L 41/5009 |
| 2022/0182304 | A1* | 6/2022 | Yu | H04L 43/16 |
| 2022/0224446 | A1* | 7/2022 | Fan | H04L 1/1812 |
| 2022/0330049 | A1* | 10/2022 | Tan | H04L 1/08 |
| 2023/0209554 | A1* | 6/2023 | Kuo | H04W 72/23 370/329 |
| 2023/0231655 | A1* | 7/2023 | Yue | H04L 1/1887 370/328 |
| 2023/0284274 | A1* | 9/2023 | Loehr | H04L 1/187 370/329 |
| 2023/0308229 | A1* | 9/2023 | Kuo | H04L 1/22 |
| 2023/0309180 | A1* | 9/2023 | Tesanovic | H04W 76/25 |
| 2023/0362707 | A1* | 11/2023 | Fu | H04L 47/283 |
| 2024/0298346 | A1* | 9/2024 | Zou | H04W 76/15 |
| 2024/0373283 | A1* | 11/2024 | Zou | H04W 80/02 |

OTHER PUBLICATIONS

CATT, "Handling of Survival Time", R2-2102726, 3GPP TSG-RAN WG2 Meeting #113bis-e Online, Apr. 12-Apr. 20, 2021.

CATT, "Survival time triggered PDCP duplication", R2-1905752, 3GPP TSG-RAN WG2 Meeting #106 Reno, USA, May 13-May 17, 2019.

3GPP TS 22.104, "3rd Generation Partnership Project; Technical Specification Group Services and System Aspects; Service requirements for cyber-physical control applications in vertical domains; Stage 1 (Release 18)", V18.1.0 (Jun. 2021).

3GPP TS 22.261, "3rd Generation Partnership Project; Technical Specification Group Services and System Aspects; Service requirements for the 5G system; Stage 1 (Release 18)", V18.3.0 (Jun. 2021).

3GPP TS 38.211, "3rd Generation Partnership Project; Technical Specification Group Radio Access Network; NR; Physical channels and modulation (Release 16)", V16.6.0 (Jun. 2021).

3GPP TS 38.212, "3rd Generation Partnership Project; Technical Specification Group Radio Access Network; NR; Multiplexing and channel coding (Release 16)", V16.6.0 (Jun. 2021).

3GPP TS 38.214, "3rd Generation Partnership Project; Technical Specification Group Radio Access Network; NR; Physical layer procedures for data (Release 16)", V16.6.0 (Jun. 2021).

3GPP TS 38.321, "3rd Generation Partnership Project; Technical Specification Group Radio Access Network; NR; Medium Access Control (MAC) protocol specification (Release 16)", V16.5.0 (Jun. 2021).

3GPP TS 38.331, "3rd Generation Partnership Project; Technical Specification Group Radio Access Network; NR; Radio Resource Control (RRC) protocol specification (Release 16)", V16.5.0 (Jun. 2021).

\* cited by examiner

METHOD AND USER EQUIPMENT FOR HANDLING A SURVIVAL TIME STATE

CROSS-REFERENCE TO RELATED APPLICATION(S)

The present disclosure claims the benefit of and priority to U.S. Provisional Patent Application Ser. No. 63/224,307, filed on Jul. 21, 2021, entitled "METHOD AND APPARATUS TO HANDLE SURVIVAL TIME" ("the '307 provisional") and U.S. Provisional Patent Application Ser. No. 63/260,051, filed on Aug. 6, 2021, entitled "METHOD AND APPARATUS TO HANDLE UPLINK TRANSMISSION IN SURVIVAL TIME STATE" ("the '051 provisional"). The contents of the '307 provisional and the '051 provisional are hereby incorporated fully by reference into the present disclosure for all purposes.

FIELD

The present disclosure is related to wireless communication and, more particularly, to a method and a user equipment (UE) for handling a survival time state in next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize network services and types, accommodating various use cases such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for handling a survival time state in next generation wireless communication networks.

In a first aspect of the present disclosure, a method performed by a user equipment (UE) for handling a survival time state is provided. The method includes: receiving a Packet Data Convergence Protocol (PDCP) configuration for indicating that a Data Radio Bearer (DRB) associated with a PDCP entity supports a survival time state functionality, the PDCP entity being associated with at least two Radio Link Control (RLC) entities; receiving an Uplink (UL) grant for retransmission of a Medium Access Control (MAC) Protocol Data Unit (PDU), the MAC PDU including data from the DRB; entering the survival time state for the DRB upon receiving the UL grant; and activating a PDCP duplication for the PDCP entity during the survival time state.

In an implementation of the first aspect of the present disclosure, the PDCP configuration includes an indication indicating that the DRB associated with the PDCP entity supports the survival time state functionality, and the indication is in an enumerate format.

In another implementation of the first aspect of the present disclosure, the UL grant is associated with a Configured Scheduling-Radio Network Temporary Identifier (CS-RNTI).

In yet another implementation of the first aspect of the present disclosure, the method further includes, after activating the PDCP duplication for the PDCP entity: duplicating a PDCP PDU; and sending the duplicated PDCP PDU from the PDCP entity to each of the at least two RLC entities.

In yet another implementation of the first aspect of the present disclosure, the UL grant includes a Hybrid Automatic Repeat Request (HARQ) process ID of a HARQ process; and the MAC PDU is stored in a HARQ process buffer of the HARQ process.

In a second aspect of the present disclosure, a UE for handling a survival time state is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive a Packet Data Convergence Protocol (PDCP) configuration for indicating that a Data Radio Bearer (DRB) associated with a PDCP entity supports a survival time state functionality, the PDCP entity being associated with at least two Radio Link Control (RLC) entities; receive an Uplink (UL) grant for retransmission of a Medium Access Control (MAC) Protocol Data Unit (PDU), the MAC PDU including data from the DRB; enter the survival time state for the DRB upon receiving the UL grant; and activate a PDCP duplication for the PDCP entity during the survival time state.

In an implementation of the second aspect of the present disclosure, the PDCP configuration includes an indication indicating that the DRB associated with the PDCP entity supports the survival time state functionality, and the indication is in an enumerate format.

In another implementation of the second aspect of the present disclosure, the UL grant is associated with a Configured Scheduling-Radio Network Temporary Identifier (CS-RNTI).

In yet another implementation of the second aspect of the present disclosure, the at least one processor is further configured to execute the computer-executable instructions to, after activating the PDCP duplication for the PDCP entity: duplicate a PDCP data PDU; and send the duplicated PDCP data PDU from the PDCP entity to each of the at least two RLC entities.

In yet another implementation of the second aspect of the present disclosure, the UL grant includes a Hybrid Automatic Repeat Request (HARQ) process ID of a HARQ process; and the MAC PDU is stored in a HARQ process buffer of the HARQ process.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
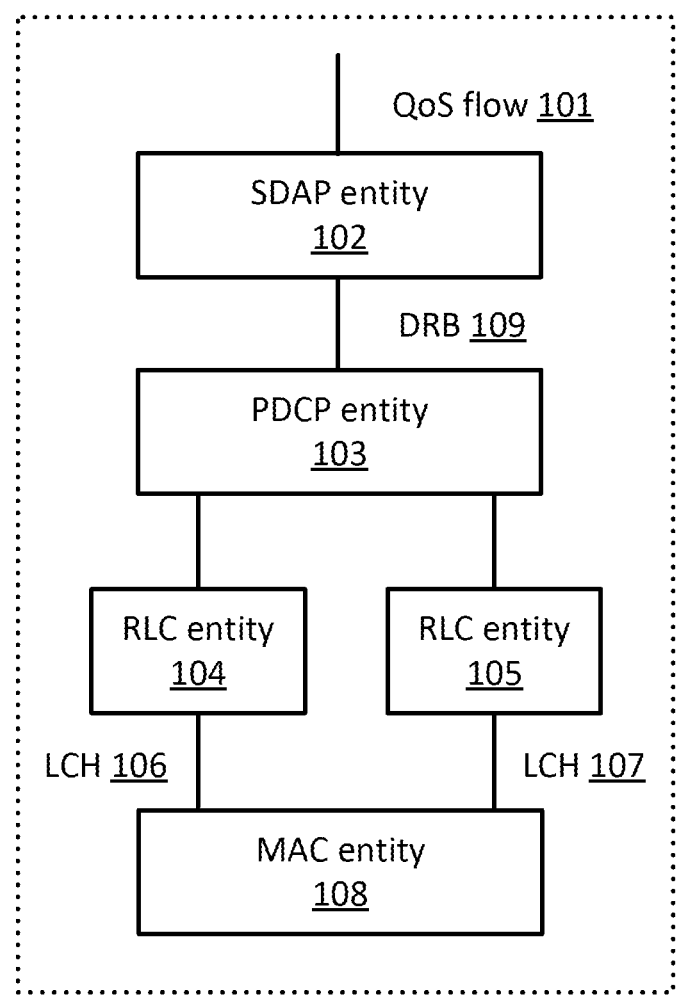
FIG. 1 is a schematic diagram illustrating components corresponding to a service according to an example implementation of the present disclosure.

Some of the acronyms used in the present application are defined as follows, unless otherwise specified:

| Acronym | Full name |
| --- | --- |
| 3GPP | 3$^{rd}$ Generation Partnership Project |
| 5G | 5$^{th}$ generation |
| 5GC | 5G Core |
| ACK | Acknowledgement |
| ASIC | Application Specific Integrated Circuitry |
| BFR | Beam Failure Recovery |
| BS | Base Station |
| BSC | BS Controller |
| BWP | Bandwidth Part |
| CD-ROM | Compact Disc Read-Only Memory |
| CG | Configured Grant |
| CG | Cell Group |
| CN | Core Network |
| CP | Cyclic Prefix |
| C-RNTI | Cell-Radio Network Temporary Identifier |
| CS-RNTI | Configured Scheduling-Radio Network Temporary Identifier |
| CSI | Channel State Information |
| DCI | Downlink Control Information |
| DFI | Downlink Feedback Information |
| DL | Downlink |
| DMRS | Demodulation Reference Signal |
| DRB | Data Radio Bearer |
| DSP | Digital Signal Processor |
| E-UTRA | Evolved Universal Terrestrial Radio Access |
| E-UTRAN | Evolved Universal Terrestrial Radio Access Network |
| EDGE | Enhanced Data rates for GSM Evolution |
| EEPROM | Electrically Erasable Programmable Read-Only Memory |
| eMBB | enhanced Mobile Broadband |
| EPC | Evolved Packet Core |
| EPROM | Erasable Programmable Read-Only Memory |
| GERAN | EDGE RAN |
| gNB | Next Generation Node B |
| GPRS | General Packet Radio Service |
| GSM | Global System for Mobile communication |
| HARQ | Hybrid Automatic Repeat request |
| HSPA | High-Speed Packet Access |
| ID | Identifier |
| IE | Information Element |
| IIoT | Industrial Internet of Things |
| LBT | Listen Before Talk |
| LCH | Logical Channel |
| LCID | Logical Channel Identity |
| LCP | Logical Channel Prioritization |
| LDPC | Low-Density Parity-Check |
| LTE | Long-Term Evolution |
| LTE-A | LTE-Advanced |

-continued

| Acronym | Full name |
| --- | --- |
| L1 | Layer 1 |
| MAC | Medium Access Control |
| MCG | Master Cell Group |
| MCS-C-RNTI | Modulation Coding Scheme Cell Radio Network Temporary Identifier |
| mMTC | massive Machine-Type Communication |
| NACK | Negative Acknowledgment |
| NAS | Non-Access Stratum |
| NDI | New Data Indicator |
| NR | New RAT/Radio |
| NR-U | New Radio Unlicensed |
| NW | Network |
| OFDM | Orthogonal Frequency-Division Multiplexing |
| PCell | Primacy Cell |
| PDCP | Packet Data Convergence Protocol |
| PDU | Protocol Data Unit |
| PHY | Physical |
| ProSe | Proximity Service |
| PSCell | Primary Secondary Cell |
| PUCCH | Physical Uplink Control Channel |
| PUSCH | Physical Uplink Shared Channel |
| QoS | Quality of Service |
| RACH | Random Access Channel |
| RAM | Random Access Memory |
| RAN | Radio Access Network |
| RAT | Radio Access Technology |
| RB | Radio Bearer |
| Rel | Release |
| RLC | Radio Link Control |
| RLF | Radio Link Failure |
| RNC | Radio Network Controller |
| RNTI | Radio Network Temporary Identifier |
| ROM | Read Only Memory |
| RRC | Radio Resource Control |
| SCell | Secondary Cell |
| SCG | Secondary Cell Group |
| SCS | Subcarrier Spacing |
| SDAP | Service Data Adaptation Protocol |
| SDU | Service Data Unit |
| SFN | System Frame Number |
| SL | Sidelink |
| SLIV | Start and Length Indicator Value |
| SN | Sequence Number |
| SpCell | Special Cell |
| TB | Transport Block |
| TR | Technical Report |
| TS | Technical Specification |
| TX | Transmission |
| UCE | Unlicensed Controlled Environment |
| UE | User Equipment |
| UL | Uplink |
| UMTS | Universal Mobile Telecommunications System |
| URLLC | Ultra-Reliable and Low-Latency Communication |
| V2X | Vehicle to Everything |
| W-CDMA | Wideband-Code Division Multiple Access |
| WiMAX | Worldwide Interoperability for Microwave Access |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application-Specific Integrated Circuits (ASICs), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture, such as a Long-Term Evolution (LTE) system, an LTE-Advanced (LTE-A) system, an LTE-Advanced Pro system, or a 5G NR Radio Access Network (RAN), typically includes at least one base station (BS), at least one UE, and one or more optional network elements that provide connection within a network. The UE communicates with the network, such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to one or more UEs within its radio coverage such that each cell schedules the DL and optionally UL resources to at least one UE within its radio coverage for DL and optionally UL packet transmissions. The BS can communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

A network may be a fixed station or base station used for communicating with the terminals and may also be referred to as an access point, a Node B, a base station, an enhanced base station, an eNodeB, a gNodeB (gNB), or some other terminology.

A Component Carrier (CC) may include a PCell, a PSCell, and/or a SCell.

An SpCell may include a PCell and a PSCell.

A UL resource may include a RACH resource, a PUCCH resource, and/or a PUSCH resource. The UL resource may be scheduled by dynamic grant (e.g., via PDCCH) and/or configured by RRC (e.g., type 1/type 2 configured UL grant or pre-configured in an RRC configuration).

An entity may be referred to as the UE in the present disclosure.

An application may be referred to as a service in the present disclosure.

A MAC PDU may be referred to as a TB in the present disclosure.

The configured grant configuration may include (but is not limited to) a configured grant Type 1 or a configured grant Type 2.

There are two types of transmission without dynamic grant:
  (a) Configured grant Type 1, where an uplink grant is provided by an RRC message and stored as a configured uplink grant.
  (b) Configured grant Type 2, where an uplink grant is provided by a PDCCH and stored or cleared as a configured uplink grant based on L1 signaling indicating configured uplink grant activation or deactivation.

A configured uplink grant may be referred to as a PUSCH resource that corresponds to a configured grant configuration.

A CG PUSCH may be referred to as a PUSCH that corresponds to a configured grant configuration.

A HARQ-ACK may be either an ACK or a NACK.

The UE may consider a generated MAC PDU/TB as being obtained.

When the timer cg-RetransmissionTimer is configured and the HARQ entity obtains a MAC PDU to transmit, the corresponding HARQ process is considered to be pending. For a configured uplink grant configured with the timer cg-RetransmissionTimer, each associated HARQ process is considered as not pending when any of the following conditions (a)-(c) is satisfied.

(a) A transmission is performed on the HARQ process and an LBT failure indication is not received from lower layers.
  (b) The configured uplink grant is initialized and the HARQ process is not associated with another active configured uplink grant.
  (c) A HARQ buffer for the HARQ process is flushed.

A HARQ process ID (of a configured grant configuration) may be considered for retransmission if either of the following conditions (a) and (b) is satisfied.
  (a) The timer configuredGrantTimer of the HARQ process ID is running (and the HARQ process is pending/not pending).
  (b) The timer configuredGrantTimer for the HARQ process ID is not running and the HARQ process is pending.

A HARQ process (of a configured grant configuration) may be considered for new transmission (e.g., initial transmission) if the timer configuredGrantTimer of the HARQ process ID is not running (and the HARQ PROCESS ID is not pending).

A UL resource may also be referred to as a UL grant.

Data may be referred to as a PDU and/or a SDU in the present disclosure.

The HARQ process ID for new transmission may have least one of the following characteristics (a)-(e).
  (a) The HARQ process ID for new transmission does not correspond to a pending MAC PDU.
  (b) The HARQ process ID for new transmission may not be identified as pending.
  (c) The timer configuredGrantTimer of the HARQ process ID for new transmission may not be configured, or may be configured and is not running.
  (d) The timer cg-RetransmissionTimer of the HARQ process ID for new transmission may not be configured, or may be configured and is not running.
  (e) The HARQ process ID of new transmission may not correspond to a deprioritized CG PUSCH/MAC PDU.

The HARQ process ID for retransmission may have least one of the following characteristics (a)-(e).
  (a) The HARQ process ID for retransmission may include a pending MAC PDU.
  (b) The HARQ process ID for retransmission may be identified as pending.
  (c) The timer configuredGrantTimer of the HARQ process ID for retransmission may not be configured, or may be configured and is (not) running.
  (d) The timer cg-RetransmissionTimer of the HARQ process ID for retransmission may not be configured, or may be configured and is not running.
  (e) A DFI indicating ACK may not have been received for the HARQ process ID for retransmission.

Table 1 below shows an example of a HARQ entity.

TABLE 1

For each uplink grant, the HARQ entity may:
  1> identify the HARQ process associated with the uplink grant, and for each identified HARQ process:
    2> if the received uplink grant was not addressed to a Temporary C-RNTI on the PDCCH, and the NDI provided in the associated HARQ information has been toggled compared to the value in the previous transmission of the TB of the HARQ process; or
    2> if the uplink grant was received on the PDCCH for the C-RNTI and the HARQ buffer of the identified process is empty; or
    2> if the uplink grant was received in a Random Access Response (e.g., in a MAC RAR or a fallback RAR); or TABLE 1-continued 2> if the uplink grant was determined as specified in the 3GPP TS 38.321 for the transmission of the MSGA payload; or
2> if the uplink grant was received on the PDCCH for the C-RNTI in ra-ResponseWindow and the PDCCH successfully completed the Random Access procedure initiated for beam failure recovery; or
2> if the uplink grant is part of a bundle of the configured uplink grant, and may be used for initial transmission according to the 3GPP TS 38.214, and if no MAC PDU has been obtained for the bundle:
   3> if there is a MAC PDU in the MSGA buffer and the uplink grant determined as specified in the 3GPP TS 38.321 for the transmission of the MSGA payload was selected; or
   3> if there is a MAC PDU in the MSGA buffer and the uplink grant was received in a fallbackRAR and the fallbackRAR successfully completed the Random Access procedure:
      4> obtain the MAC PDU to transmit from the MSGA buffer.
   3> else if there is a MAC PDU in the Msg3 buffer and the uplink grant was received in a fallbackRAR:
      4> obtain the MAC PDU to transmit from the Msg3 buffer.
   3> else if there is a MAC PDU in the Msg3 buffer and the uplink grant was received in a MAC RAR; or:
   3> if there is a MAC PDU in the Msg3 buffer and the uplink grant was received on the PDCCH for the C-RNTI in ra-ResponseWindow and the PDCCH successfully completed the Random Access procedure initiated for beam failure recovery:
      4> obtain the MAC PDU to transmit from the Msg3 buffer.
      4> if the uplink grant size does not match with size of the obtained MAC PDU; and
      4> if the Random Access procedure was successfully completed upon receiving the uplink grant:
         5> indicate to the Multiplexing and assembly entity to include MAC subPDU(s) carrying MAC SDU from the obtained MAC PDU in the subsequent uplink transmission;
         5> obtain the MAC PDU to transmit from the Multiplexing and assembly entity.
   3> else if the uplink grant is a configured grant configured with autonomousTx; and
   3> if the previous configured uplink grant, in the BWP, for the HARQ process was not prioritized; and
   3> if a MAC PDU had already been obtained for the HARQ process; and
   3> if the uplink grant size matches with size of the obtained MAC PDU; and
   3> if none of PUSCH transmission(s) of the obtained MAC PDU has been completely performed:
      4> consider the MAC PDU has been obtained.
   3> else if the MAC entity is not configured with lch-basedPrioritization; or
   3> if the uplink grant is a prioritized uplink grant:
      4> obtain the MAC PDU to transmit from the Multiplexing and assembly entity, if any;
   3> if a MAC PDU to transmit has been obtained:
      4> if the uplink grant is not a configured grant configured with autonomousTx; or
      4> if the uplink grant is a prioritized uplink grant:
         5> deliver the MAC PDU and the uplink grant and the HARQ information of the TB to the identified HARQ process;
         5> instruct the identified HARQ process to trigger a new transmission;
         5> if the uplink grant is a configured uplink grant:
            6> start or restart the configuredGrantTimer, if configured, for the corresponding HARQ process when the transmission is performed if the LBT failure indication is not received from lower layers;
            6> start or restart the cg-RetransmissionTimer, if configured, for the corresponding HARQ process when the transmission is performed if the LBT failure indication is not received from lower layers.
         5> if the uplink grant is addressed to the C-RNTI, and the identified HARQ process is configured for a configured uplink grant:
            6> start or restart the configuredGrantTimer, if configured, for the corresponding HARQ process when the transmission is performed if the LBT failure indication is not received from lower layers.
         5> if cg-RetransmissionTimer is configured for the identified HARQ process; and
         5> if the transmission is performed and the LBT failure indication is received from lower layers:
            6> consider the identified HARQ process as pending.
   3> else:
      4> flush the HARQ buffer of the identified HARQ process.
2> else (e.g., retransmission):
   3> if the uplink grant received on the PDCCH was addressed to the CS-RNTI and if the HARQ buffer of the identified process is empty; or
      3> if the uplink grant is part of a bundle and if no MAC PDU has been obtained for the bundle; or
      3> if the uplink grant is part of a bundle of the configured uplink grant, and the PUSCH duration of the uplink grant overlaps with a PUSCH duration of another uplink grant received on the PDCCH or an uplink grant received in a Random Access Response (e.g., MAC RAR or fallbackRAR) or an uplink grant determined as specified in the 3GPP TS 38.321 for MSGA payload for the Serving Cell; or:
      3> if the MAC entity is configured with lch-basedPrioritization and the uplink grant is not a prioritized uplink grant:
         4> ignore the uplink grant.
   3> else:
      4> deliver the uplink grant and the HARQ information (redundancy version) of the TB to the identified HARQ process;
      4> instruct the identified HARQ process to trigger a retransmission;
      4> if the uplink grant is addressed to the CS-RNTI; or
      4> if the uplink grant is addressed to the C-RNTI, and the identified HARQ process is configured for a configured uplink grant:
         5> start or restart the configuredGrantTimer, if configured, for the corresponding HARQ process when the transmission is performed if the LBT failure indication is not received from lower layers.
      4> if the uplink grant is a configured uplink grant:
         5> if the identified HARQ process is pending:
            6> start or restart the configuredGrantTimer, if configured, for the corresponding HARQ process when the transmission is performed if the LBT failure indication is not received from lower layers;
         5> start or restart the cg-RetransmissionTimer, if configured, for the corresponding HARQ process when the transmission is performed if the LBT failure indication is not received from lower layers.

TABLE 1-continued

4> if the identified HARQ process is pending and the transmission is performed and the LBT failure indication is not received from lower layers:
       5> consider the identified HARQ process as not pending.

When determining if the NDI has been toggled compared to the value in the previous transmission the MAC entity shall ignore the NDI received in all uplink grants on the PDCCH for its Temporary C-RNTI. When the timer configuredGrantTimer or the timer cg-RetransmissionTimer is started or restarted by a PUSCH transmission, the timer configuredGrantTimer or the timer cg-RetransmissionTimer may be started at the beginning of the first symbol of the PUSCH transmission.

Table 2 below shows an example of a PDCP data transfer transmit operation.

TABLE 2

When submitting a PDCP PDU to lower layer, the transmitting PDCP entity may:
- if the transmitting PDCP entity is associated with one RLC entity:
  - submit the PDCP PDU to the one RLC entity;
- else, if the transmitting PDCP entity is associated with at least two RLC entities:
  - if the PDCP duplication is activated for the RB:
    - if the PDCP PDU is a PDCP Data PDU:
      - duplicate the PDCP Data PDU and submit the PDCP Data PDU to the at least two RLC entities activated for PDCP duplication;
    - else:
      - submit the PDCP Control PDU to the primary RLC entity;
  - else (e.g., the PDCP duplication is deactivated for the RB):
    - if the split secondary RLC entity is configured; and
    - if the total amount of PDCP data volume and RLC data volume pending for initial transmission in the primary RLC entity and the split secondary RLC entity is equal to or larger than ul-DataSplitThreshold:
      - submit the PDCP PDU to either the primary RLC entity or the split secondary RLC entity;
  - else, if the transmitting PDCP entity is associated with the DAPS bearer:
    - if the uplink data switching has not been requested:
      - submit the PDCP PDU to the RLC entity associated with the source cell;
    - else:
      - if the PDCP PDU is a PDCP Data PDU:
        - submit the PDCP Data PDU to the RLC entity associated with the target cell;
      - else:
        - if the PDCP Control PDU is associated with source cell:
          - submit the PDCP Control PDU to the RLC entity associated with the source cell;
        - else:
          - submit the PDCP Control PDU to the RLC entity associated with the target cell;
  - else:
    - submit the PDCP PDU to the primary RLC entity.

If the transmitting PDCP entity is associated with two RLC entities, the UE may minimize the amount of PDCP PDUs submitted to lower layers before receiving request from lower layers and minimize the PDCP SN gap between PDCP PDUs submitted to two associated RLC entities to minimize PDCP reordering delay in the receiving PDCP entity.

Table 3 below shows an example of a configuration of PDCP duplication.

TABLE 3

PDCP-Config ::= SEQUENCE {
moreThanOneRLC SEQUENCE {
primaryPath SEQUENCE {
cellGroup CellGroupId OPTIONAL, -- Need R
logicalChannel LogicalChannelIdentity OPTIONAL -- Need R
},
ul-DataSplitThreshold UL-DataSplitThreshold OPTIONAL, -- Cond SplitBearer
pdcp-Duplication BOOLEAN OPTIONAL -- Need R
}

TABLE 3-continued moreThanTwoRLC-DRB-r16 SEQUENCE {
splitSecondaryPath-r16 LogicalChannelIdentity OPTIONAL, -- Cond SplitBearer2
duplicationState-r16 SEQUENCE (SIZE (3)) OF BOOLEAN OPTIONAL -- Need S
} OPTIONAL, -- Cond MoreThanTwoRLC-DRB An entity (e.g., MAC entity) of a UE may trigger a survival time state (or a survival time state procedure) when the UE enters the survival time state. The UE may cancel the triggered survival time state (or a survival time state procedure) when the UE leaves the survival time state.

An entity (e.g., MAC entity) of a UE may trigger a survival time state (or a survival time state procedure) for a service when the service of the UE enters the survival time state. The UE may cancel the triggered survival time state (or a survival time state procedure) for the service when the corresponding service leaves the survival time state.

FIG. 1 is a schematic diagram illustrating components corresponding to a service according to an example implementation of the present disclosure.

The components corresponding to a service 100 may include a QoS flow 101, an SDAP entity 102, a PDCP entity 103, RLC entities 104 and 105, LCHs 106 and 107, a MAC entity 108, a CG configuration (not illustrated), a PDU session (not illustrated), etc. The components that map to the same service may also be associated with each other. The QoS flow 101, the SDAP entity 102, the PDCP entity 103, the RLC entity 104, the RLC entity 105, the LCH 106, the LCH 107, the MAC entity 108 may correspond to the service 100. The LogicalChannelConfig IE of the LCH 106 may include allowedCG-List and allowedServingCells. The LogicalChannelConfig IE of the LCH 107 may include allowedCG-List and allowedServingCells. The CG configuration(s) indicated by allowedCG-List in LogicalChannelConfig of the LCH 106 or 107 may correspond to the service 100. The serving cell(s) indicated by allowedServingCells in LogicalChannelConfig of the LCH 106 or 107 may correspond to the service 100. The SDAP entity 102 may be mapped to a PDU session that corresponds to the service 100. The DRB 109 may be configured for the service 100. The other components of the FIG. 1 may also be associated with the DRB 109.

In the following, a configured uplink grant is described. With configured uplink grants, the network may allocate the UL resources (e.g., PUSCH resources) for the initial HARQ transmissions to UEs via the RRC configuration (and the PDCCH). Two types (e.g., Type 1 and Type 2) of configured uplink grants may be defined. With Type 1, the RRC layer/entity may directly provide the configured uplink grant (including the periodicity). A UL resource (e.g., a PUSCH resource) that corresponds to a configured grant Type 1 configuration may be configured directly by the network via the RRC signaling. With Type 2, the RRC layer/entity may define the periodicity of the configured uplink grant while the PDCCH addressed to the CS-RNTI can either signal and activate the configured uplink grant, or deactivate the configured uplink grant. For example, a PDCCH addressed to the CS-RNTI may indicate that the uplink grant can be implicitly reused according to the periodicity defined by the RRC until deactivated.

Type 1 and Type 2 may be configured by the RRC layer/entity for a serving cell per BWP. Multiple configurations can be active simultaneously in the same BWP. For Type 2, activation and deactivation may be independent among the serving cells. For the same BWP, the MAC entity may be configured with both Type 1 and Type 2.

The RRC may configure the following parameters (a)-(e) when the configured grant Type 1 is configured.
(a) CS-RNTI: the CS-RNTI for retransmission.
(b) Periodicity: the periodicity of the configured grant Type 1.
(c) timeDomainOffset: the offset of a resource with respect to SFN=0 in time domain.
(d) timeDomainAllocation: the allocation of configured uplink grant in time domain which contains startSymbolAndLength (e.g., SLIV as specified in the 3GPP TS 38.214).
(e) nrofHARQ-Processes: the number of HARQ processes for the configured grant.

Upon configuring a configured grant Type 1 for a serving cell by upper layers, the MAC entity may (i) store the uplink grant provided by the upper layers as a configured uplink grant for the indicated serving cell, and (ii) initialize or re-initialize the configured uplink grant to start in the symbol according to timeDomainOffset and S (derived from SLIV as specified in the 3GPP TS 38.214), and to reoccur with periodicity.

Figure 2:
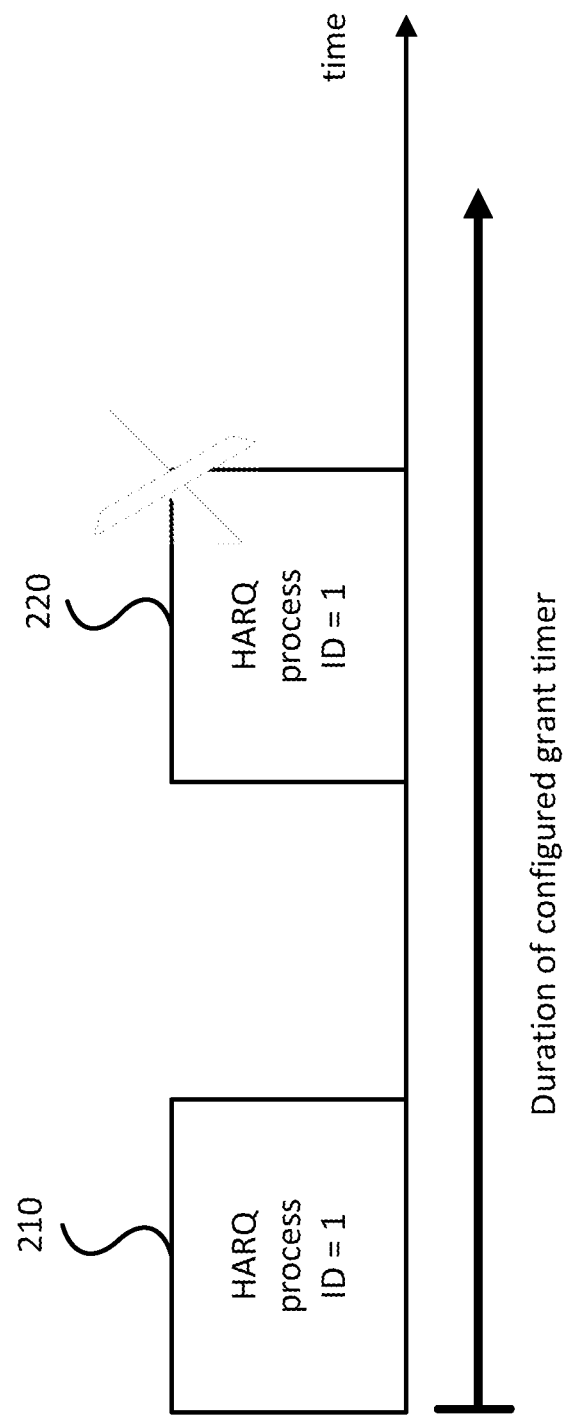
FIG. 2 is a timing diagram illustrating a configured grant timer operation in NR according to an example implementation of the present disclosure.

FIG. 2 is a timing diagram illustrating a configured grant timer operation in NR according to an example implementation of the present disclosure.

In NR Rel-15, a timer configuredGrantTimer is introduced. The timer configuredGrantTimer may be maintained per HARQ process ID. Whenever a UE performs a specific (re-)transmission (e.g., on a resource indicated by an uplink grant addressed to a C-RNTI and the identified HARQ process is configured for a configured uplink grant, on a PUSCH that corresponds to a configured uplink grant (e.g., a CG PUSCH 210 in FIG. 2), or on a resource indicated by an uplink grant addressed to the CS-RNTI), a timer configuredGrantTimer that corresponds to the HARQ process ID (e.g., HARQ process ID=1) of the (re-)transmission is (re)started (e.g., upon transmission on CG PUSCH 210). While the timer configuredGrantTimer that corresponds to a HARQ process is running, the UE is prohibited from performing a new transmission (e.g., generate a new TB/MAC PDU for transmission) on a configured uplink grant (e.g., a CG PUSCH 220 in FIG. 2) of the HARQ process ID.

According to the 3GPP TS 22.261, the survival time is defined as the time that an application consuming a communication service may continue without an anticipated message. The effect of using survival time means that even if a message is not successfully delivered, the communication system may still be considered available at least until the survival time has elapsed. In other words, once the application senses an absence (or unsuccessful reception) of expected messages, it may wait a pre-set period before considering the communication service to be unavailable. According to the 3GPP TS 22.104, the survival times of various motion control applications may be found in Table 4. It is noted that the transfer interval may be defined as the time difference between two consecutive transfers of application data from an application via the service interface to a 3GPP system.

Table 4 below shows an example of the survival time and the transfer interval.

TABLE 4

| Transfer interval: target value | Survival time | UE speed | Remarks |
| --- | --- | --- | --- |
| 500 μs | 500 μs | ≤75 km/h | Motion control |
| 1 ms | 1 ms | ≤75 km/h | Motion control |
| 2 ms | 2 ms | ≤75 km/h | Motion control |

Based on the agreement from 3GPP RAN2 #113bis-e meeting, the relevant survival time requirements to consider are those of the periodic deterministic communication service, as expressed in Table 5.2-1 as specified in the 3GPP TS 22.104. For non-stringent applications (e.g., for applications with survival time of >1 ms), whenever the UE successfully transmits UL application data (e.g., a UL application message), the network may have enough time to react to the survival time after sensing that the UE does not successfully transmit the application data. For those applications, the network may schedule retransmission(s) or transmission(s) with higher reliability requirements and measures (e.g., lower MCS table, higher transmission power, etc.) to serve the UE's UL application traffic before the survival time deadline.

However, for stringent applications (e.g., for applications with survival time of <1 ms, such as the motion control application in the first row of Table 4), the network may have not enough time to react to the survival time after sensing that the UE does not successfully transmit the UL application data. For those applications, the network may not have time to schedule retransmission(s) or transmission(s) with higher reliability requirements and measures to serve the UE's UL application traffic before the survival time deadline. Moreover, in those cases, as soon as one UL transmission, which includes the UL application data, fails, the subsequent UL application data may need to be delivered to the network successfully. Otherwise, the survival time may be violated.

A reactive-based mechanism may be introduced to ensure the UL transmission (that includes application data) is successfully transmitted to the network after a failed UL transmission (that includes data of the same application). With the reactive-based mechanism, the UE may dynamically adjust the reliability requirements and measures of a UL transmission based on certain conditions. In some implementations, after a UE unsuccessfully transmits the UL data of an application to the network, the UE may dynamically improve the reliability of a subsequent UL transmission for (re)transmitting UL data of the same application. As such, the chances of successfully delivering the UL data to the network in the subsequent UL transmission may be increased before the survival time of the application expires.

In the following, a configuration of survival time state functionalities to a service/application is described. An indication or a configuration may be used to indicate whether the survival time state functionality is supported by a service.

In some implementations, the network may configure/indicate the survival time state functionality to a service of the UE. The UE may determine whether the survival time state functionality is supported by the service based on a first configuration/indication provided by the network and/or based on the presence of a new IE. The UE may apply the survival time state mechanism for the service that supports the survival time state functionality. In contrast, the UE may not apply the survival time state mechanism for the service that does not support the survival time state functionality. The data of a service that supports the survival time state functionality may be considered, by the UE, as a factor for entering/leaving the survival time state. The data of a service that does not support the survival time state functionality may not be considered, by the UE, as a factor for entering/leaving the survival time state. In some implementations, a UE may enter the survival time state upon (consecutive) unsuccessful UL transmission(s) (e.g., transmission on a PUSCH resource) including data from a service that supports the survival time state functionality. The UE may not enter the survival time state upon one or more unsuccessful UL transmissions (e.g., a transmission on a PUSCH resource) including data from a service that does not support the survival time state functionality. In some implementations, a UE may leave the survival time state upon one or more successful UL transmissions (e.g., a transmission on a PUSCH resource) including data from a service that supports the survival time state functionality. The UE may not leave the survival time state upon one or more successful UL transmissions (e.g., a transmission on a PUSCH resource) including data from a service that does not support the survival time state functionality.

Figure 3:
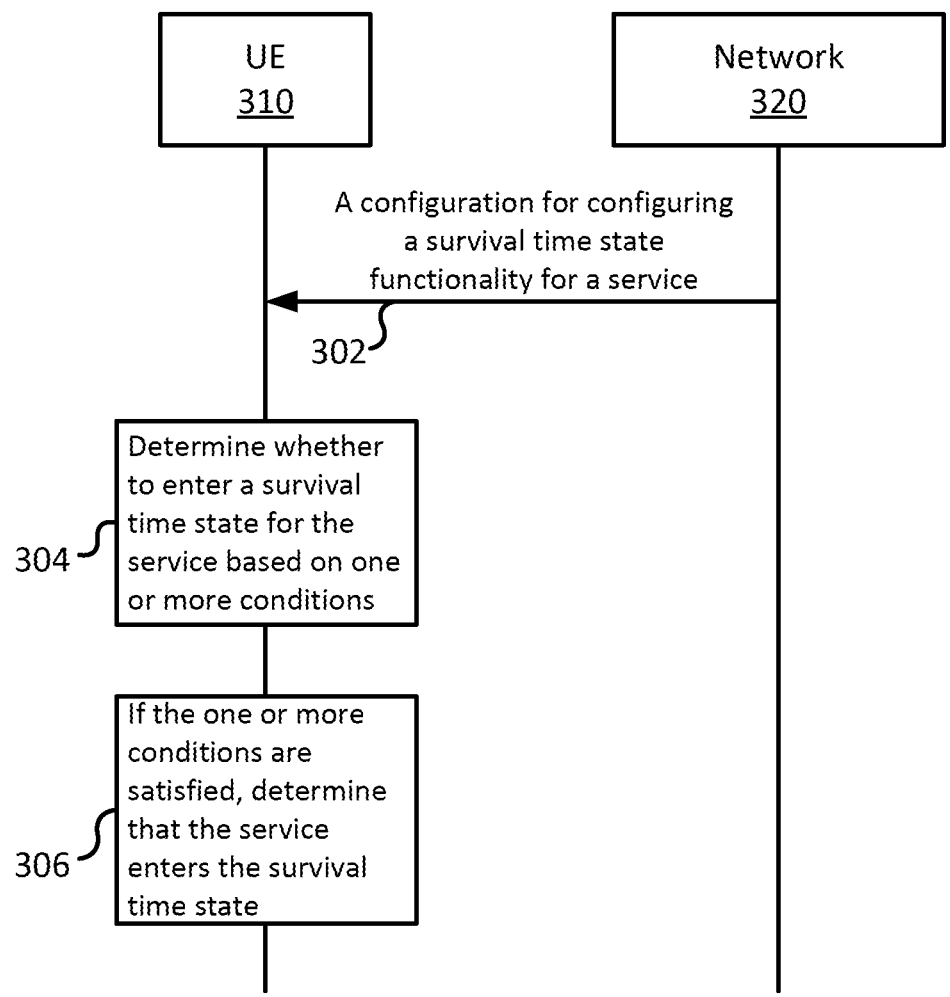
FIG. 3 is a signaling flow diagram for configuring a survival time state functionality for a service according to an example implementation of the present disclosure.

FIG. 3 is a signaling flow diagram 300 for configuring a survival time state functionality for a service according to an example implementation of the present disclosure. In action 302, a UE 310 may receive, from a network 320, a configuration for configuring a survival time state functionality for a service. The survival time state functionality may be configured in a DRB configuration that is associated with the service. In action 304, the UE 310 may determine whether to enter a survival time state for the service based on one or more conditions. In action 306, if the one or more conditions are satisfied, the UE 310 may determine that the service enters the survival time state. In some implementations, the one or more conditions may be at least one of the following: (a) a counter value of a counter for counting the number of unsuccessful data transmissions, is equal to a threshold, (b) a timer T1 for determining whether to enter survival time state, is expired, and (C) data of the service is transmitted unsuccessfully from the UE 310 to the network 320 (e.g., if the data of the service is transmitted unsuccessfully from the UE 310 to the network 320, the UE 310 may receive a UL grant for retransmission of a MAC PDU from the network 320).

In some implementations, the network may indicate/configure the survival time state functionality to the UE on a per UE, per MAC entity, or per serving cell basis. The network may configure the survival time state functionality on a per UE basis. When the UE is configured with the survival time state functionality, all the services that correspond to the UE may support the survival time state functionality. The network may configure the survival time state functionality on a per serving cell basis. When a serving cell of the UE is configured with the survival time state functionality, all the services that correspond to the serving cell of the UE may support the survival time state functionality. The service may correspond to the serving cell if the data of the service is transmitted on the serving cell. The network may configure the survival time state functionality on a per MAC entity basis. When a MAC entity of the UE is configured with the survival time state functionality, all the services that correspond to the MAC entity of the UE may support the survival time state functionality. The service may correspond to the MAC entity if the data of the service is transmitted on the cell group where the MAC entity is configured. The MAC entity may be configured in a Cell-GroupConfig IE that configures the cell group.

In some implementations, the service may be mapped to a PDU session. The service that supports the survival time state functionality may be mapped to a specific PDU session ID. The network may indicate that the specific PDU session ID supports the survival time state functionality to a UE via a dedicated signaling (e.g., NAS signaling, RRC signaling, etc.).

In some implementations, the service may be mapped to a QoS flow. The service that supports the survival time state functionality may be mapped to a specific QoS flow ID. The network may indicate that the specific PDU session ID supports the survival time state functionality to a UE via a dedicated signaling (e.g., NAS signaling, RRC signaling, etc.).

In some implementations, the service may be mapped to a DRB/SRB. The service that supports the survival time state functionality may be mapped to a specific DRB/SRB ID. The network may indicate that the specific DRB/SRB ID supports the survival time state functionality to a UE via a dedicated signaling.

The first configuration/indication may be included in an IE for adding and modifying the corresponding DRB/SRB (e.g., DRB-ToAddMod/SRB-ToAddMod IE/DRB-ToAddModList/SRB-ToAddModList IE as specified in the 3GPP TS 38.331). Based on the first configuration/indication or the presence thereof, the UE may determine the corresponding service supports the survival time state functionality. In some implementations, a new IE may be used for adding and modifying the DRB/SRB of a service that supports the survival time state functionality (e.g., survival-DRB-ToAddMod IE/survival SRB-ToAddMod IE/survival-DRB-ToAddModList IE/survival-SRB-ToAddModList IE that is different from DRB-ToAddMod IE/DRB-ToAddModList IE/SRB-ToAddMod/SRB-ToAddModList IE as specified in the 3GPP TS 38.331). If the new IE is presented, the UE may determine that the corresponding service supports the survival time state functionality.

The survival-DRB-ToAddMod IE/survival-SRB-ToAddMod IE may be provided by a gNB via a downlink RRC signaling. The survival-DRB-ToAddMod IE/survival-SRB-ToAddMod IE may be applied once the UE enters the survival time state. The survival-DRB-ToAddMod IE/survival-SRB-ToAddMod IE may include particular PDCP, RLC and LCH configurations, which associate with a particular DRB/SRB indicated by the survival-DRB-ToAddMod IE/survival-SRB-ToAddMod IE. The DRB/SRB may be indicated to be associated with the service that supports the survival time state functionality.

The first configuration/indication may be included in an IE that is used to set the configurable SDAP parameters for the DRB/SRB of the service (e.g., SDAP-Config IE as specified in the 3GPP TS 38.331). Based on the first configuration/indication or the presence thereof, the UE may determine the corresponding service supports the survival time state functionality. In some implementations, a new IE may be used for setting the configurable SDAP parameters for the DRB/SRB of a service that supports the survival time state functionality (e.g., survival-SDAP-Config IE that is different from SDAP-Config IE as specified in the 3GPP TS 38.331). If the new IE is presented, the UE may determine that the corresponding service supports the survival time state functionality.

The first configuration/indication may be included in an IE that is used to set the configurable PDCP parameters for the DRB/SRB of the service (e.g., PDCP-Config IE as specified in the 3GPP TS 38.331). Based on the first configuration/indication or the presence thereof, the UE may determine the corresponding service supports the survival time state functionality. In some implementations, a new IE may be used for setting the configurable PDCP parameters for the DRB/SRB of a service that supports the survival time state functionality (e.g., survival-PDCP-Config IE that is different from PDCP-Config IE as specified in the 3GPP TS 38.331). If the new IE is presented, the UE may determine that the corresponding service supports the survival time state functionality.

The first configuration/indication may be included in an IE that is used to specify the RLC configuration for the DRB/SRB of the service (e.g., RLC-Config IE as specified in the 3GPP TS 38.331). Based on the first configuration/indication or the presence thereof, the UE may determine the corresponding service supports the survival time state functionality. In some implementations, a new IE may be used for specifying the RLC configuration for the DRB/SRB of a service that supports the survival time state functionality (e.g., survival-RLC-Config IE that is different from RLC-Config IE as specified in the 3GPP TS 38.331). If the new IE is presented, the UE may determine that the corresponding service supports the survival time state functionality. The survival-RLC-Config IE may be provided by a gNB via a downlink RRC signaling. The survival-RLC-Config IE may be applied once the UE enters the survival time state. The survival-RLC-Config IE may include RLC and LCH configurations, which associate with a particular LCH. The LCH may be associated with the service that supports the survival time state functionality.

In some implementations, the service may be mapped to a PDCP entity. The PDCP entity may be associated with a DRB. The PDCP parameters of the PDCP entity may be configured in a PDCP-Config IE or a survival-PDCP-Config IE. The PDCP entity may be mapped to at least one RLC entity. The presence of a moreThanOneRLC IE may be used to indicate that more than one RLC entity is associated with the PDCP entity. The presence of a moreThanTwoRLC-DRB IE may be used to indicate that more than two RLC entities are associated with the PDCP entity. The first configuration/indication may be included in the moreThanOneRLC IE/moreThanTwoRLC-DRB IE. Based on the first configuration/indication or the presence thereof, the UE may determine the corresponding service supports the survival time state functionality. In some implementations, a new IE may be used for associating more than one RLC entity/two RLC entities to the PDCP entity of a service that supports the survival time state functionality (e.g., survival-moreThanOneRLC IE/survival-moreThanTwoRLC-DRB IE that is different from moreThanOneRLC IE/moreThanTwoRLC-DRB IE as specified in the 3GPP TS 38.331). If the new IE is presented, the UE may determine that the corresponding service supports the survival time state functionality.

In some implementations, the service may be mapped to an RLC entity. The link/mapping between the RLC entity and a PDCP entity and the link/mapping between the RLC entity and an LCH may be configured in an RLC-BearerConfig IE. The RLC entity of the service that supports the survival time state functionality may be mapped to a specific LCH/LCG ID. The network may indicate that the specific LCH/LCG ID supports the survival time state functionality to a UE via a dedicated signaling. The first configuration/indication may be included in the RLC-BearerConfig IE. Based on the first configuration/indication or the presence thereof, the UE may determine the corresponding service supports the survival time state functionality. In some implementations, a new IE may be used to link/map the RLC entity and the DRB of a service that supports the survival time state functionality (e.g., survival-RLC-BearerConfig IE that is different from RLC-BearerConfig IE as specified in the 3GPP TS 38.331). If the new IE is presented, the UE may determine that the corresponding service supports the survival time state functionality.

In some implementations, the service may be mapped to an LCH. The LCH parameters of the LCH may be configured in a LogicalChannelConfig IE. The first configuration/indication may be included in the LogicalChannelConfig IE. Based on the first configuration/indication or the presence thereof, the UE may determine the corresponding service supports the survival time state functionality. In some implementations, a new IE may be used to configure the LCH parameters of the LCH of a service that supports the survival time state functionality (e.g., survival-LogicalChannelConfig IE that is different from LogicalChannelConfig IE as specified in the 3GPP TS 38.331). If the new IE is presented, the UE may determine that the corresponding service supports the survival time state functionality. The service that supports the survival time state functionality may be mapped to a specific (set of) LCH parameters (e.g., with specific values). If the (set of) LCH parameters is presented (e.g., with specific values), the UE may determine that the corresponding service supports the survival time state functionality. The specific (set of) LCH parameters may include at least one of allowedServingCells, allowedSCS-List, maxPUSCH-Duration, configuredGrantType1Allowed, logicalChannelGroup, schedulingRequestID, logicalChannel SR-Mask, logicalChannelSR-DelayTimerApplied, allowedCG-List-r16, and allowedPHY-PriorityIndex-r16.

In some implementations, if the service supports the survival time state functionality, the data of the service may be mapped to a specific CG configuration. The specific CG configuration may have a specific CG ID (e.g., configuredGrantConfigIndex). The network may configure a specific CG ID that may be used for transmitting data of a service that supports the survival time state functionality, to a UE, via a dedicated signaling. The UE may consider that the data transmitted on a PUSCH resource of the specific CG configuration is from a service that supports the survival time state functionality.

The first configuration/indication may be included in the ConfiguredGrantConfig IE. Based on the first configuration/indication or the presence thereof, the UE may consider the data transmitted on a PUSCH resource of the corresponding CG configuration is from a service that supports the survival time state functionality. In some implementations, a new IE may be used to configure the CG configuration that supports transmission of data of a service that supports the survival time state functionality (e.g., survival-ConfiguredGrantConfig IE that is different from ConfiguredGrantConfig IE as specified in the 3GPP TS 38.331). If the new IE is presented, the UE may determine that the data transmitted on a PUSCH resource of the corresponding CG configuration is from a service that supports the survival time state functionality.

The survival-ConfiguredGrantConfig IE may be provided by a gNB via a downlink RRC signaling. The survival-ConfiguredGrantConfig IE may be used to configure a CG configuration that is applied by the UE during survival time state (e.g., when the UE enters the survival time state). For example, the CG configuration configured by the survival-ConfiguredGrantConfig IE may be activated/(re-)initialized once the UE enters the survival time state. The CG configuration configured by the survival-ConfiguredGrantConfig IE may not be applied by the UE outside the survival time state (e.g., when the UE leaves survival time state). For example, the CG configuration configured by the survival-ConfiguredGrantConfig IE may be deactivated/suspended/cleared/discarded once the UE leaves the survival time state. A CG configuration configured by the survival-ConfiguredGrantConfig IE may be referred to as a special CG configuration.

In some implementations, if a service supports the survival time state functionality, the data of the service may be mapped to a set of at least one CG configuration. The set of at least one CG configuration may be configured in a ConfiguredGrantConfigToAddModList IE. The first configuration/indication may be included in the ConfiguredGrantConfigToAddModList IE. Based on the first configuration/indication or the presence thereof, the UE may consider the data transmitted on a PUSCH resource of the corresponding CG configuration is from a service that supports the survival time state functionality. In some implementations, a new IE may be used to configure the CG configuration that supports transmission of data of a service that supports the survival time state functionality (e.g., survival-ConfiguredGrantConfigToAddModList IE that is different from ConfiguredGrantConfig IE as specified in the 3GPP TS 38.331). If the new IE is presented, the UE may determine that the data transmitted on a PUSCH resource of the corresponding CG configuration is from a service that supports the survival time state functionality.

The survival-ConfiguredGrantConfigToAddModList IE may be provided by a gNB via a downlink RRC signaling. The survival-ConfiguredGrantConfigToAddModList IE may be used to configure the set of at least one CG configuration that is applied by the UE during the survival time state (e.g., when the UE enters the survival time state). For example, the set of at least one CG configuration configured by the survival-ConfiguredGrantConfig IE may be activated/(re-)initialized once the UE enters the survival time state. The set of at least one CG configuration configured by the survival-ConfiguredGrantConfig IE may not be applied by the UE outside the survival time state (e.g., when the UE leaves the survival time state). For example, the set of at least one CG configuration configured by the survival-ConfiguredGrantConfig IE may be deactivated/suspended/cleared/discarded once the UE leaves the survival time state. A set of at least one CG configuration configured by the survival-ConfiguredGrantConfig IE may be referred to as a special CG configuration(s).

In some implementations, if the service supports the survival time state functionality, the data of the service may be mapped to a HARQ process ID. The data of the service that supports the survival time state functionality may be mapped to a HARQ process ID via a LCP mapping restriction. For example, the network may configure the mapping between an LCH and one or more HARQ process IDs in (a LogicalChannelConfig IE of) a dedicated signaling. Based on the mapping provided by the network, the UE may determine whether a PUSCH resource of a given HARQ ID may be used for transmitting the (UL) data from the LCH. The service that supports the survival time state functionality may be mapped to a specific (group of) HARQ process ID(s). The network may indicate a specific (group of) HARQ process ID(s) for the support of the survival time state functionality to a UE via a dedicated signaling. The UE may consider that the data transmitted on a PUSCH resource with the specific HARQ ID is from a service that supports the survival time state functionality.

The PUSCH resource may correspond to a CG configuration or may be scheduled by a dynamic grant. The HARQ process ID of the PUSCH resource may be indicated by the DCI field of a dynamic grant that schedules the PUSCH resource. The HARQ process ID of the PUSCH resource may be calculated by the UE based on a predefined equation (e.g., Equation 1 or Equation 2) if the PUSCH resource corresponding to a CG configuration is not configured with a timer cg-RetransmissionTimer. The HARQ process ID of the PUSCH resource may be determined by the UE if the PUSCH resource corresponding to a CG configuration is configured with a timer cg-RetransmissionTimer.

The network may configure a specific (group of) HARQ process ID(s) for a CG configuration that can be used for transmitting data from a service supporting the survival time state functionality (e.g., a special CG configuration or a CG configuration configured by survival-ConfiguredGrantConfig IE). For example, an offset may be configured in the survival-ConfiguredGrantConfig IE, such that the UE may derive a HARQ process ID, which corresponds to the specific (group of) HARQ process ID(s), for any PUSCH of the CG configuration. The UE may avoid selecting a HARQ process ID, which does not belong to the specific (group of) HARQ process ID(s), for a PUSCH of a CG configuration that can be used for transmitting data from a service supporting the survival time state functionality (e.g., a special CG configuration or a CG configuration configured by survival-ConfiguredGrantConfig IE).

In some implementations, the first configuration/indication may be a flag, an enumerate format (e.g., ENUMERATE {TRUE}, ENUMERATE {TRUE, FALSE}), a bit indication, etc. A first value indicated by the first configuration/indication may imply that the survival time state functionality is not supported for the corresponding service, and a second value indicated by the first configuration/indication may imply that the survival time state functionality is supported for the corresponding service. The presence of the first configuration/indication may imply that the survival time state functionality is supported for the corresponding service, and the absence of the first configuration/indication may imply that the survival statue functionality is not supported for the corresponding service. The first configuration/indication may be a counter and/or a timer T1 as described in the present disclosure.

In the following, the indication(s) or configuration(s) used during the survival time state are described.

In some implementations, the network may configure/ include a first (set of) parameter(s) and a second (set of) parameter(s) in a configuration. The configuration may be mapped to a service that support the survival time state. The UE may apply the first (set of) parameter(s) and may ignore the second (set of) parameter(s) outside the survival time state. The UE may apply the first and/or the second (set of) parameter(s) during the survival time state (e.g., upon entering the survival time state). The first (set of), parameter(s) and the second (set of) parameter(s) may include the same parameter/IE but with different values.

Figure 4:
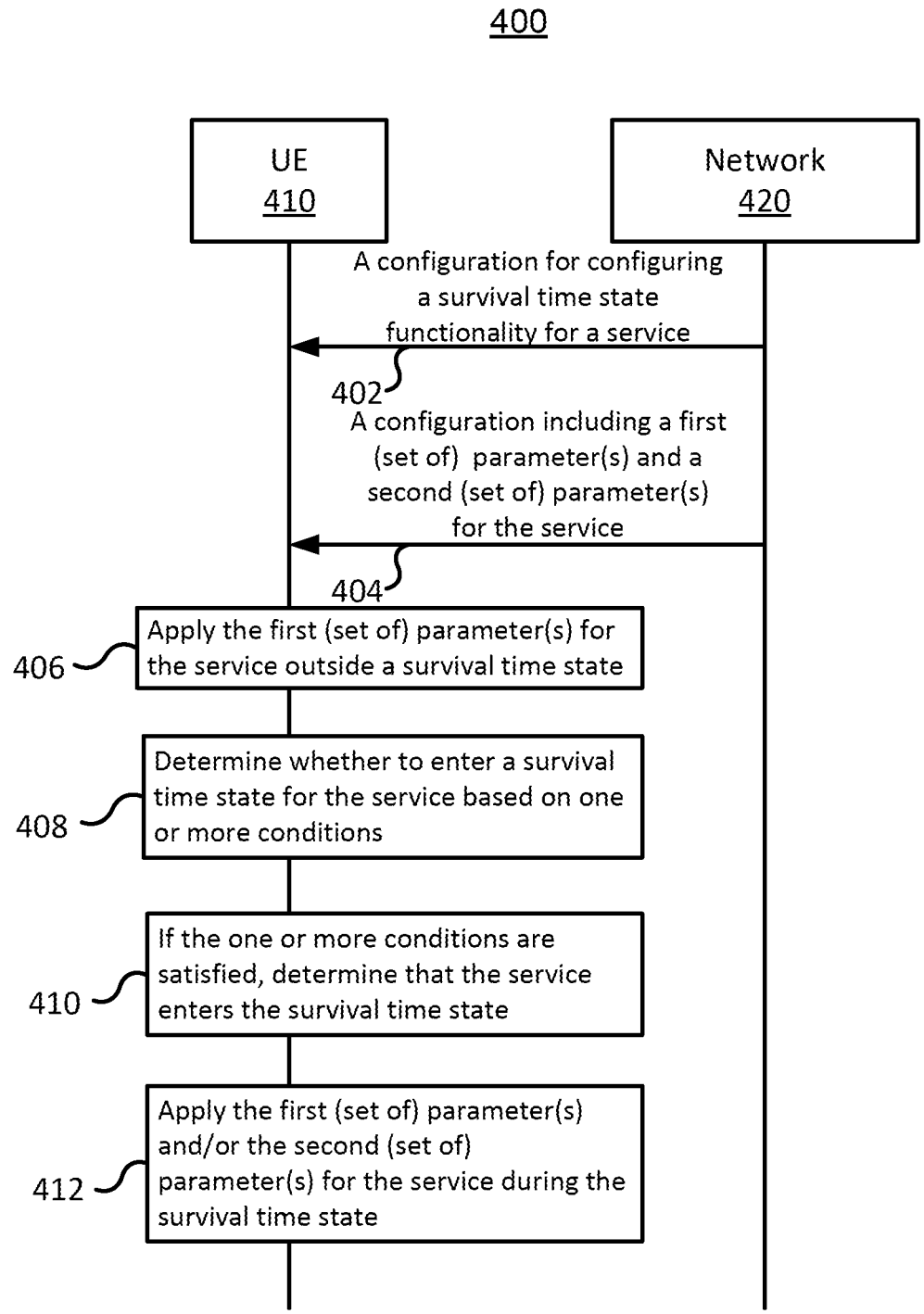
FIG. 4 is a signaling flow diagram for configuring parameters for a service during/outside a survival time state according to an example implementation of the present disclosure.

FIG. 4 is a signaling flow diagram 400 for configuring parameters for a service during/outside a survival time state according to an example implementation of the present disclosure.

In action 402, a UE 410 may receive, from a network 420, a configuration for configuring a survival time state functionality for a service.

In action 404, the UE 410 may receive, from the network 420, a configuration including a first (set of) parameter(s) and a second (set of) parameter(s) for the service.

In action 406, the UE 410 may apply the first (set of) parameter(s) for the service outside a survival time state.

In action 408, the UE 410 may determine whether to enter a survival time state for the service based on one or more conditions. In some implementations, the one or more conditions may be at least one of the following: (a) a counter value of a counter for counting the number of unsuccessful data transmissions, is equal to a threshold, (b) a timer T1 for determining whether to enter survival time state, is expired, and (C) data of the service is transmitted unsuccessfully from the UE 410 to the network 420 (e.g., if the data of the service is transmitted unsuccessfully from the UE 410 to the network 420, the UE 410 may receive a UL grant for retransmission of a MAC PDU from the network 420).

In action 410, if the one or more conditions are satisfied, the UE 410 may determine that the service enters the survival time state.

In action 412, the UE 410 may apply the first (set of) parameter(s) and/or the second (set of) parameter(s) for the service during the survival time state.

In some implementations, the configuration may be referred to as a QoS flow. The first configuration/parameter may be referred to as a first QoS flow, and the second configuration/parameter may be referred to as a second QoS flow. The first QoS flow and the second QoS flow may be mapped to the same service, PDU session, etc. The network may indicate the first QoS flow and the second QoS flow (e.g., indication using QoS flow ID) to the UE in a dedicated signaling. The UE may apply the configurations/parameters associated with the first QoS flow outside the survival time state and may apply the configurations/parameters associated with the second QoS flow during the survival time state (e.g., upon entering the survival time state). Specifically, the SDAP layer of the UE may perform QoS flow switching (e.g., switching from the first QoS flow to the second QoS flow when the UE enters the survival time state).

In some implementations, the configuration may be a DRB-ToAddModList IE to configure at least one DRB that corresponds to the service. The network may configure a first (set of) parameter(s) and a second (set of) parameter(s) in the DRB-ToAddModList IE. The first (set of) parameter(s) may include at least one DRB-ToAddMod IE to configure a first group of at least one DRB for use outside the survival time state and/or during the survival time state. The second (set of) parameter(s) may include at least one DRB-ToAddMod IE or at least one survival-DRB-ToAddMod IE to configure a second group of at least one DRB for use during the survival time state.

In some implementations, the configuration may be a DRB-ToAddMod IE to configure a DRB that corresponds to the service. The network may configure a first (set of) parameter(s) and a second (set of) parameter(s) in the DRB-ToAddMod IE. The first (set of) parameter(s) may be a first PDCP-Config IE to configure a first PDCP entity for use outside the survival time state and/or during the survival time state. The second (set of) parameter(s) may be a second PDCP-Config IE or a survival-PDCP-Config IE to configure a second PDCP entity for use during the survival time state. The first PDCP entity and the second PDCP entity may correspond to the same DRB configured by DRB-ToAddMod IE.

In some implementations, the configuration may be a PDCP-Config IE for configuring a PDCP entity that corresponds to the service. The network may configure a first (set of) parameter(s) and a second (set of) parameter(s) in the PDCP-Config IE. In other words, the PDCP entity may include a first (set of) parameter(s) and a second (set of) parameter(s). The first (set of) parameter(s) in the PDCP-Config IE may be used outside the survival time state and/or during the survival time state. The second (set of) parameter(s) in the PDCP-Config IE may be used during the survival time state. The first (set of) parameter(s) and/or the second (set of) parameter(s) may include at least one of discardTimer, discardTimerExt, moreThanOneRLC, moreThanTwoRLC-DRB, pdcp-Duplication, pdcp-SN-SizeUL, primaryPath, splitSecondaryPath, statusReportRequired, t-Reordering, ul-DataSplitThreshold, etc.

In some implementations, the configuration may be an RLC-Config IE for configuring an RLC entity that corresponds to the service. The network may configure a first (set of) parameter(s) and a second (set of) parameter(s) in the RLC-Config IE. The first (set of) parameter(s) in the RLC-Config IE may be used outside the survival time state and/or during the survival time state. The second (set of) parameter(s) in the RLC-Config IE may be used during the survival time state. The first (set of) parameter(s) and/or the second (set of) parameter(s) may include at least one of UL-AM-RLC, UL-UM-RLC, T-PollRetransmit, PollPDU, PollByte, T-Reassembly, T-StatusProhibit, SN-FieldLengthUM, SN-FieldLengthAM, etc.

In some implementations, the configuration may be an RLC-BearerConfig IE for configuring the mapping between the DRB corresponding to the service and the LCH corresponding to the service. The network may configure a first (set of) parameter(s) and a second (set of) parameter(s) in the RLC-Config IE. The first (set of) parameter(s) in the RLC-Config IE may be used outside the survival time state and/or during the survival time state. The second (set of) parameter(s) in the RLC-Config IE may be used during the survival time state. The first (set of) parameter(s) and/or the second (set of) parameter(s) may include at least one of logicalChannelIdentity, rlc-Config, mac-LogicalChannelConfig, etc.

In some implementations, the configuration may be a LogicalChannelConfig IE. The network may configure a first (set of) parameter(s) and a second (set of) parameter(s) in the LogicalChannelConfig IE. The first (set of) parameter(s) in the LogicalChannelConfig IE may be used outside the survival time state and/or during the survival time state. The second (set of) parameter(s) in the LogicalChannelConfig IE may be used during the survival time state. The first (set of) parameter(s) and/or the second (set of) parameter(s) may include at least one of priority, prioritisedBitRate, bucketSizeDuration, allowedServingCells, allowedSCS-List, maxPUSCH-Duration, configuredGrantType1 Allowed, logicalChannelGroup, schedulingRequestID, logicalChannelSR-Mask, logicalChannelSR-DelayTimerApplied, allowedCG-List-r16, and allowedPHY-PriorityIndex-r16, etc.

The CG configuration indicated in the allowedCG-List in the first (set of) parameter(s) may be referred to as a default CG configuration in the present disclosure. Hence, the data from the LCH associated with the service may be mapped to the default CG configuration. Moreover, the default CG be used by the UE for transmitting data from the service while outside the survival time state. The CG configuration indicated in the allowedCG-List in the second (set of) parameter(s) may be referred to as a special CG configuration in the present disclosure. Hence, the data from the LCH associated with the service may be mapped to the special CG configuration. The special CG configuration may be used by the UE for transmitting data from the service during the survival time state.

The network may configure a first allowedCG-List that corresponds to a first (set of) parameter(s) and a second allowedCG-List that corresponds to a second (set of) parameter(s) in a LogicalChannelConfig IE of a UE. The LogicalChannelConfig IE may be used to configure an LCH that corresponds to a service supporting the survival time state functionality. The first allowedCG-List may include at least one default CG configuration. The second allowedCG-List may include at least one special CG configuration.

In the present disclosure, the special CG configuration may be activated/(re-)initialized (by the UE) when the UE enters the survival time state (and during the survival time state). The special CG configuration may be deactivated/suspended/cleared/discarded (by the UE) when the UE leaves the survival time state (and outside the survival time state). The default CG configuration may be activated/(re-)initialized (by the UE) when the UE is not in the survival time state (e.g., when the UE leaves the survival time state) and/or when the UE is in the survival time state. The default CG configuration may be deactivated/suspended/cleared/discarded (by the UE) when the UE enters the survival time state (and during the survival time state). If the UE activates/(re-)initialize the special CG configuration upon entering the survival time state, the UE may send an activation/(re-)initialization confirmation to the network. If the UE deactivates/suspends the special CG configuration upon leaving the survival time state, the UE may send a deactivation/suspension confirmation to the network. If the UE activates/(re-)initializes the default CG upon leaving the survival time state, the UE may send an activation/(re-)initialization confirmation to the network. If the UE deactivates/suspends the default CG configuration upon entering the survival time state, the UE may send a deactivation/suspension confirmation to the network. At least one of an activation, (re-)initialization, deactivation, and suspension confirmation may be a RRC message or a MAC CE. At least one of an activation, (re-)initialization, deactivation, and suspension confirmation may indicate the ID of the CG configuration or the service that has been activated/(re-)initialized/deactivated/suspended. At least one of an activation, (re-)initialization, deactivation, and suspension confirmation may be indicated in the same RRC message/MAC CE.

In some implementations, the configuration may be a ConfiguredGrantConfig IE to configure a CG configuration. The network may configure a first (set of) parameter(s) and a second (set of) parameter(s) in the ConfiguredGrantConfig IE. The first (set of) parameter(s) in the ConfiguredGrantConfig IE may be used outside the survival time state and/or during the survival time state. The second (set of) parameter(s) in the ConfiguredGrantConfig IE may be used during the survival time state. The first (set of) parameter(s) and/or the second (set of) parameter(s) may include at least one of frequencyHopping, cg-DMRS-Configuration DMRS-UplinkConfig, mcs-Table ENUMERATED, mcs-TableTransformPrecoder, uci-OnPUSCH, resourceAllocation, rbg-Size, powerControlLoopToUse, p0-PUSCH-Alpha, transformPrecoder, nrofHARQ-Processe, repK, repK-RV, periodicity, configuredGrantTimer, timeDomainOffset, timeDomainAllocation, frequencyDomainAllocation, antennaPort, dmrs-SeqInitialization, precodingAndNumberOfLayers, srs-ResourceIndicator, mcsAndTBS, frequencyHoppingOffset, pathlossReferenceIndex, pusch-RepTypeIndicator-r16, frequencyHoppingPUSCH-RepTypeB-r16, timeReferenceSFN-r16, timeReferenceSFN, etc.

The CG configuration may be mapped to data of at least one service that supports the survival time state functionality. Specifically, the ConfiguredGrantConfig IE may be mapped to data from an LCH that corresponds to a service that supports the survival time state functionality. The CG configuration may be referred to as a special CG configuration and/or a default CG configuration. The network may configure a first periodicity, a first repK, and a first mcs-Table that corresponds to a first set of parameters and a second periodicity, a second repK, and a second mcs-Table that corresponds to a second set of parameters in a ConfiguredGrantConfig IE of a UE. The value of the first periodicity/repK/mcs-Table may be different from the value of the second periodicity/repK/mcs-Table. The UE may apply the first periodicity/repK/mcs-Table outside the survival time state. The UE may apply the second periodicity/repK/mcs-Table during the survival time state.

A p0-PUSCH IE may be configured in ConfiguredGrantConfig IE which provides an index P0-PUSCH-SetId to a set of P0-PUSCH-Set configured for the active UL BWP. $P_{O\_UE\_PUSCH,b,f,c}$ may be provided by p0 obtained from a p0-PUSCH-Alpha in ConfiguredGrantConfig that provides an index P0-PUSCH-AlphaSetId to a set of P0-PUSCH-AlphaSet for the active UL BWP outside the survival time state. $P_{O\_UE\_PUSCH,b,f,c}$ may be provided by p0 obtained from the p0-PUSCH in ConfiguredGrantConfig that provides an index P0-PUSCH-SetId to the set of P0-PUSCH-Set for the active UL BWP during the survival time state.

In some implementations, the configuration may be a ConfiguredGrantConfigToAddModList IE to configure at least one CG configuration. The network may configure a first (set of) parameter(s) and a second (set of) parameter(s) in the ConfiguredGrantConfigToAddModList IE. The first (set of) parameter(s) may include at least one ConfiguredGrantConfig IE to configure a first group of at least one (default) CG configuration for use outside the survival time state and/or during the survival time state. The second (set of) parameter(s) may include at least one ConfiguredGrantConfig IE or at least one survival-ConfiguredGrantConfig IE to configure a second group of at least one (special) CG configuration for use duration the survival time state. In one example, the network may configure at least one default CG configuration that corresponds to a first set of parameters and at least one default CG configuration that corresponds to a second (set of) parameter(s) in a ConfiguredGrantConfig-ToAddModList IE of a UE.

In some implementations, the configuration may be a CellGroupConfig IE. The network may configure a first (set of) parameter(s) and a second (set of) parameter(s) in the CellGroupConfig IE. The first (set of) parameter(s) in the CellGroupConfig IE may be used outside the survival time state and/or during the survival time state. The second (set of) parameter(s) in the CellGroupConfig IE may be used during the survival time state. The first (set of) parameter(s) and/or the second (set of) parameter(s) may include at least one of mac-CellGroupConfig, physicalCellGroupConfig, etc.

In some implementations, the configuration may be a PUSCH-Config IE. The network may configure a first (set of) parameter(s) and a second (set of) parameter(s) in the PUSCH-Config IE. The first (set of) parameter(s) in the PUSCH-Config IE may be used outside the survival time state and/or during the survival time state. The second (set of) parameter(s) in the PUSCH-Config IE may be used during the survival time state. The first (set of) parameter(s) and/or the second (set of) parameter(s) may include at least one of pusch-PowerControl, mcs-Table, etc. A first P0-PUSCH-AlphaSet and a second P0-PUSCH-AlphaSet may be provided in a PUSCH-Config. $P_{O\_UE\_PUSCH,b,f,c}$ may be provided by p0 obtained from p0-PUSCH-Alpha in ConfiguredGrantConfig that provides an index P0-PUSCH-AlphaSetId to the first set of P0-PUSCH-AlphaSet for the active UL BWP outside the survival time state. $P_{O\_UE\_PUSCH,b,f,c}$ may be provided by p0 obtained from p0-PUSCH-Alpha in ConfiguredGrantConfig that provides an index P0-PUSCH-AlphaSetId to the second set of P0-PUSCH-AlphaSet for the active UL BWP during the survival time state.

In some implementations, the network may associate at least one RLC entity with a PDCP entity of a UE (e.g., configured by a PDCP-Config IE). The PDCP entity of the UE (e.g., configured by the PDCP-Config IE) may correspond to a service that supports the survival time state functionality. The UE may submit a (duplicated) PDCP data PDU to a first set of RLC entities, which includes the at least one RLC entity, outside the survival time state. The UE may submit a (duplicated) PDCP data PDU to the first set of RLC entity(s) and/or a second set of RLC entity(s), which includes the at least one RLC entity, during the survival time state (e.g., upon entering the survival time state).

If the UE determines to submit a PDCP data PDU to more than one RLC entity that associates with the PDCP entity, the UE may duplicate the PDCP data PDU, and submit the duplicated PDCP data PDU to each of the RLC entities. The first set of RLC entity(s) may include at least one RLC entity. The second set of RLC entity(s) may include at least one RLC entity. When the second set has only one RLC entity, the RLC entity may be configured in moreThanOneRLC IE or survival-moreThanOneRLC IE. When the second set has more than one RLC entity, the RLC entities from the second set may be configured in moreThanTwoRLC-DRB IE or survival-moreThanTwoRLC-DRB IE.

The UE may not submit the PDCP data PDU to the second set of RLC entity(s) outside the survival time state. The first set of RLC entity(s) that associates with the PDCP entity may be configured/indicated in the PDCP-Config IE. The network may indicate the LCIDs (e.g., LogicalChannelIdentity) of the first set of RLC entity(s) in the PDCP-Config IE. The second set of RLC entity(s) that associate with the PDCP entity may be configured/indicated in the PDCP-Config IE. The UE network may indicate the LCIDs (e.g., LogicalChannelIdentity) of the second set of RLC entity(s) in the PDCP-Config IE.

In some implementations, the network may further indicate a duplication status of the PDCP entity via an indication. The indication may be included in a dedicated RRC message (e.g., in the PDCP-Config IE of the dedicated RRC message) or in a duplication (de)activation MAC CE. The indication may be set to a first value to indicate the duplication status is "activated" for the PDCP entity. The indication may be set to a second value to indicate the duplication status is "deactivated" for the PDCP entity. If the duplication status is "deactivated" for the PDCP entity, the UE may submit the PDCP data PDU to the first set of RLC entities both outside the survival time state and during the survival time state. If the duplication status is "activated" for the PDCP entity, the UE may submit the PDCP data PDU to both the first set of RLC entities and the second set of RLC entities during the survival time state. If the duplication status is "activated" for the PDCP entity, the UE may submit the PDCP data PDU to the first set of RLC entities outside the survival time state.

If the indication is not presented, the UE may consider all the RLC entity(s) that correspond to the first set of RLC entity(s) as being activated outside the survival time state. If the indication is not presented, the UE may consider all the RLC entity(s) that correspond to the second set of RLC entity(s) as being deactivated outside the survival time state. If the indication is not presented, the UE may consider all the RLC entity(s) that correspond to the first set of RLC entity(s) and/or the second set of RLC entity(s) as being activated during the survival time state. When the UE (or the service of the UE) enters the survival time state, the UE may consider all the RLC entity(s) that correspond to the first set of RLC entity(s) and/or the second set of RLC entity(s) as being activated during the survival time state, regardless of the presence and the value of the indication that indicates the duplication status. When the UE (or the service of the UE) leaves the survival time state, the UE may consider all the RLC entity(s) that correspond to the first set of RLC entity(s) and/or the second set of RLC entity(s) as being deactivated, regardless of the presence and the value of the indication that indicates the duplication status. The indication may be configured in moreThanOneRLC IE or survival-moreThanOneRLC IE.

In some implementations, the network may further indicate an activation/deactivation status of each of the RLC entity(s) in the first set and/or the second set via an indication. The indication may be included in a dedicated RRC message (e.g., in the PDCP-Config IE of the dedicated RRC message) or in a MAC CE. As such, the UE may only submit the duplicated PDCP data PDU the first set of RLC entity(s) that is active outside the survival time state. The UE may submit the duplicated PDCP data PDU to the first set of RLC entity(s) and/or the second set of RLC entity(s) that is active during the survival time state. (e.g., upon entering the survival time state).

The MAC CE may include the indication and a DRB identity that corresponds to the PDCP entity with which the first set and the second set of RLC entity(s) associate. If the service is currently in the survival time state, the UE may ignore the received MAC CE if the MAC CE indicates the DRB that corresponds to the service. The UE may not apply the (de)activation status indicated in the MAC CE. If the service is currently in the survival time state, the UE may apply the received MAC CE if the MAC CE indicates the DRB that corresponds to the service. The UE may leave the survival time state of the service. If the service is currently in the survival time state, the UE may receive a MAC CE indicating the DRB that corresponds to the service.

The indication may be a bitmap. Each bit of the bitmap may correspond to one RLC entity. The index of the indication may be in ascending or descending order of LCD of all RLC entities (in the second set of RLC entity(s)) in the order of MCG and SCG. A first value (e.g., TRUE, 1, etc.) of a bit in the bitmap may indicate the corresponding RLC entity is activated. A second value (e.g., FALSE, 0, etc.) of a bit in the bitmap may indicate the corresponding RLC entity is deactivated. If the indication is not presented, the UE may consider all the RLC entity(s) that correspond to the first set of RLC entity(s) as being activated outside the survival time state. If the indication is not presented, the UE may consider all the RLC entity(s) that correspond to the second set of RLC entity(s) as being deactivated outside the survival time state. If the indication is not presented, the UE may consider all the RLC entity(s) that correspond to the first set of RLC entity(s) and/or the second set of RLC entity(s) as being activated during the survival time state.

When the UE (or the service of the UE) enters the survival time state, the UE may consider all the RLC entity(s) that correspond to the first set of RLC entity(s) and/or the second set of RLC entity(s) as being activated during the survival time state, regardless of the activation/deactivation status of the RLC entities that associates with the PDCP entity of the service. When the UE (or the service of the UE) leaves the survival time state, the UE may consider all the RLC entity(s) that correspond to the first set of RLC entity(s) and/or the second set of RLC entity(s) as being deactivated outside the survival time state, regardless of the activation/ deactivation status of the RLC entity(s) that associates with the PDCP entity of the service. When both the indication that indicates the duplication status of the PDCP entity and the indication that indicates the activation/deactivation status of the RLC entity(s) in the first set and/or the second set are configured, the UE may ignore the indication that indicates the duplication status, and follow the indication that indicates the activation/deactivation status of the RLC entity(s) in the first set and/or the second set when submitting the (duplicated) PDCP data PDU to the lower layer. The indication may be configured in moreThanTwoRLC-DRB IE or survival-moreThanTwoRLC-DRB IE.

A special RLC entity that corresponds to the first set of RLC entity(s) and/or the second RLC entity may be configured. The special RLC entity may be explicitly configured by the network via a dedicated RRC signaling. The UE may submit the PDCP control PDU to the special RLC entity when the UE is during the survival time state, outside the survival time state, and/or the UE has more than one active RLC entity. Only one special RLC entity may be configured by the network in the PDCP-Config IE.

Each RLC entity in the first set of RLC entity(s) may be mapped to an LCH, and the LCH may be mapped to a default CG configuration. In the present disclosure, the default CG configuration may be activated/(re-)initialized when the UE is outside the survival time state. The default CG configuration may not be activated/(re-)initialized when the UE is in the survival time state. The CG configuration may be deactivated/suspended (by the UE) upon entering the survival time state.

Each RLC entity in the second set of RLC entity(s) may be mapped to an LCH, and the LCH may be mapped to a special CG configuration. In the present disclosure, the special CG configuration may be activated/(re-)initialized when the UE enters the survival time state. The special CG configuration may not be activated/(re-)initialized when the UE is outside the survival time state. The CG configuration may be deactivated/suspended (by the UE) upon leaving the survival time state.

In the following, some conditions for entering the survival time state are described.

In some implementations, a counter may be maintained at a UE. A threshold may be configured by the network. The UE may determine whether to enter the survival time state based on the value of the counter. For example, the UE may enter the survival time state when the value of the counter reaches the specific threshold (e.g., is equal to or greater than the specific threshold).

Figure 5:
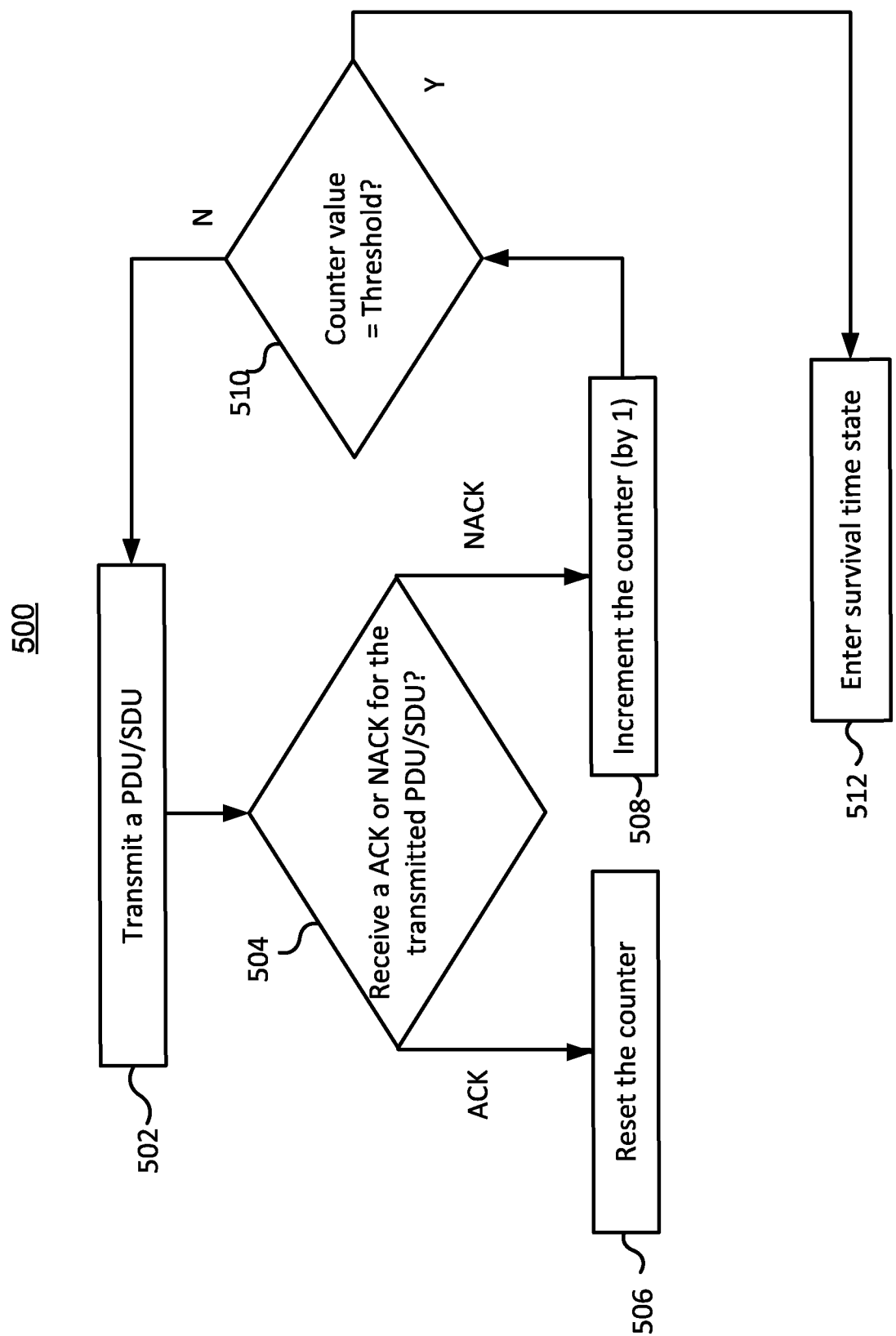
FIG. 5 is a flowchart diagram illustrating a method perform by a UE for determining whether to enter a survival time state (for a service) based on the configured counter according to an example implementation of the present disclosure.

FIG. 5 is a flowchart diagram illustrating a method 500 perform by a UE for determining whether to enter a survival time state (for a service) based on the configured counter according to an example implementation of the present disclosure.

In action 502, the UE may transmit a PDU/SDU to a network.

In action 504, the UE may determine whether an ACK or a NACK for the transmitted PDU/SDU is received from the network.

In action 506, if the UE receives the ACK from the network, the UE may reset the counter.

In action 508, if the UE receives the NACK from the network, the UE may increment the counter value of the counter (e.g., increment the counter value by 1).

In action 510, the UE may determine whether the counter value is equal to a threshold.

In action 512, if the counter value is equal to the threshold, the UE may determine to enter the survival time state (for a service).

In some implementations, a timer T1 may be maintained at a UE. The UE may determine whether to enter the survival time state (for a service) based on the status of the timer. For example, the UE may enter the survival time state (for a service) when the timer T1 expires.

Figure 6:
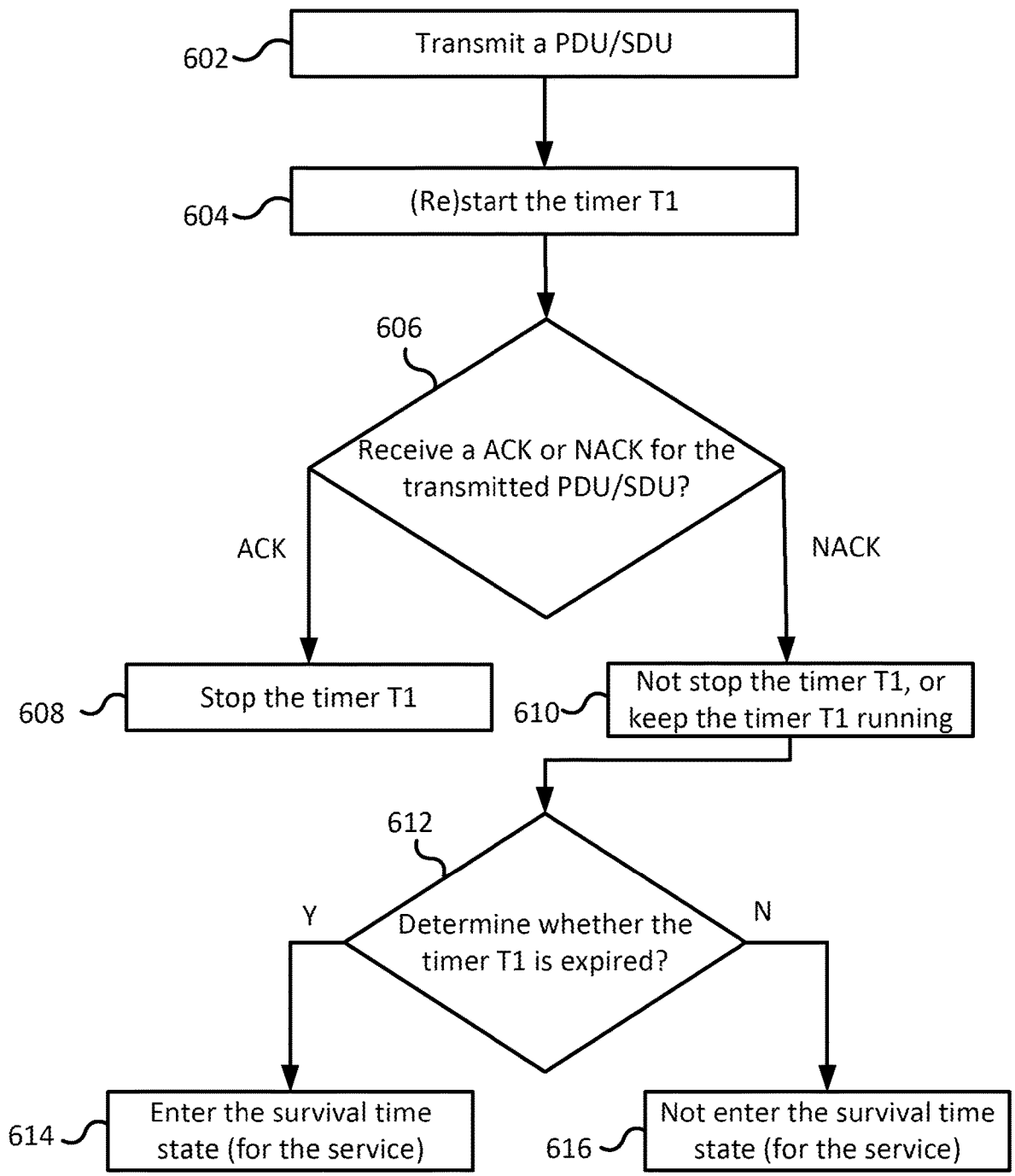
FIG. 6 is a flowchart diagram illustrating a method perform by a UE for determining whether to enter a survival time state (for a service) based on the configured timer T1 according to an example implementation of the present disclosure.

FIG. 6 is a flowchart diagram illustrating a method 600 perform by a UE for determining whether to enter a survival time state (for a service) based on the configured timer T1 according to an example implementation of the present disclosure.

In action 602, the UE may transmit a PDU/SDU to a network.

In action 604, upon/after the UE transmits the PDU/SDU to the network, the UE may (re)start the timer T1.

In action 606, the UE may determine whether an ACK or a NACK for the transmitted PDU/SDU is received from the network.

In action 608, if the UE receives the ACK from the network, the UE may stop the timer T1.

In action 610, if the UE receives the NACK from the network, the UE may not stop the timer T1, or keep the timer T1 running.

In action 612, the UE may determine whether the timer T1 is expired.

In action 614, if the timer T1 is expired, the UE may determine to enter the survival time state (for the service).

In action 616, if the timer T1 is not expired, the UE may determine not to enter the survival time state (for the service).

In some implementations, the counter may be maintained per UE, per (group of) HARQ process(es), per (group of) CG configuration(s), per (group of) BWP(s), per (group of) serving cell(s), per entity, per (group of) QoS flow(s), per (group of) LCH(s), per (group of) RB(s), per (group of) PDU session(s), per PDU/SDU. The entity may be a MAC entity, an RLC entity, a PDCP entity, or an SDAP entity. The RLC entity may be a primary RLC entity. The PDU/SDU may be a MAC PDU/SDU, an RLC PDU/SDU, a PDCP PDU/SDU, an SDAP PDU/SDU, etc.

In some implementations, the threshold may be configured per UE, per (group of) HARQ process(es), per (group of) CG configuration(s), per (group of) BWP(s), per (group of) serving cell(s), per entity, per (group of) QoS flow(s), per (group of) LCH(s), per (group of) RB(s), per (group of) PDU session(s), or per PDU/SDU. The entity may be a MAC entity, an RLC entity, a PDCP entity, or an SDAP entity. The RLC entity may be a primary RLC entity.

In some implementations, the timer T1 may be configured per UE, per (group of) HARQ process(es), per (group of) CG configuration(s), per (group of) BWP(s), per (group of) serving cell(s), per entity, per (group of) QoS flow(s), per (group of) LCH(s), per (group of) RB(s), per (group of) PDU session(s), or per PDU/SDU. The entity may be a MAC entity, an RLC entity, a PDCP entity, or an SDAP entity. The RLC entity may be a primary RLC entity.

In some implementations, the counter may be incremented (by 1) and/or the timer T1 may be (re)started when at least one of the following conditions (e.g., Condition (i) to Condition (v)) is satisfied. In some implementations, the UE may enter the survival time state directly when at least one of the following conditions (e.g., Condition (i) to Condition (v)) is satisfied.

Condition (i): The UE transmits a PDU/SDU or is ready to transmit a PDU/SDU to the network.

The PDU/SDU may be a PDCP PDU/SDU, an RLC PDU/SDU, a MAC PDU/SDU, etc. The network may configure the timer T1 that is equal to or shorter than the traffic pattern of a service that supports the survival time state. In some implementations, the network may configure the timer T1 that is equal to or shorter than the periodicity of a CG configuration that may be used for transmitting data of a service supporting the survival time state functionality (e.g., a default CG configuration and/or a special CG configuration). In some implementations, the network may configure the timer T1 that is equal to or shorter than the survival time state of a service.

The PDU/SDU may have at least one of the following characteristics (e.g., Characteristics (i) to Characteristics (iv)). As such, the counter may be incremented (by 1) and/or the timer T1 may be (re)started only upon transmission of the PDU/SDU with at least one of the following characteristics (e.g., Characteristics (i) to Characteristics (iv)).

Characteristic (i): The PDU/SDU may have specific HARQ process ID. The specific HARQ process ID may be referred to as a HARQ process ID that corresponds to a default CG configuration and/or a special CG configuration. The specific HARQ process ID may be explicitly configured by the network, e.g., for use by UL transmission that includes data of a service supporting the survival time state functionality.

Characteristic (ii): The PDU/SDU may have a specific SN. The specific SN may be any number that satisfies SN mod X=Y, where X and Y may both be positive integers. The SN may be referred to as a PDCP SN. The counter and/or the timer T1 may be maintained/configured per PDCP entity. The PDU/SDU may be referred to as a PDCP PDU/SDU. The counter may be incremented (by 1) and/or the timer T1 may be (re)started only upon transmission of the PDCP PDU/SDU with a specific SN. The SN may be referred to as an RLC SN. The counter and/or timer T1 may be maintained/configured per RLC entity. The PDU/SDU may be referred to as an RLC PDU/SDU. The counter may be incremented (by 1) and/or the timer T1 may be (re)started only upon transmission of the RLC PDU/SDU with a specific SN.

Characteristic (iii): The PDU/SDU maybe transmitted on a specific UL resource. The specific UL resource may be explicitly configured, e.g., the specific UL resource may be a PUSCH that corresponds to a default CG configuration and/or a special CG configuration. The PDU/SDU may be referred to as a MAC PDU/SDU.

Characteristic (iv): The PDU/SDU may include data from a service that supports the survival time state functionality. The network may configure the survival time state functionality to the service.

In some implementations, the counter may be incremented (by 1) and/or the timer T1 may be (re)started when a PUSCH becomes available for new transmission. The PUSCH may be specifically used for transmitting data of a service that supports the survival time state functionality. The PUSCH may be from a default CG configuration and/or a special CG configuration. The counter may not be incremented (by 1) and/or the timer T1 may not be (re)started when a PUSCH becomes available for retransmission.

In some implementations, the counter may be incremented (by 1) and/or the timer T1 may be (re)started when data becomes available/arrives. The data may be from a service that supports the survival time state functionality (e.g., from a LCH that corresponds to a service supporting the survival time state functionality). The counter may be incremented (by 1) and/or the timer T1 may be (re)started when data becomes available/arrives at the UE's entity. The entity may be a (specific) SDAP entity, a (specific) PDCP entity, a (specific) RLC entity, and/or a MAC entity. The data may be for new transmission.

In some implementations, the counter may be incremented (by 1) and/or the timer T1 may be (re)started when the PDU/SDU is generated/obtained/multiplexed. The PDU/SDU may have at least one of the characteristics (e.g., the Characteristics (i) to Characteristics (iv) as defined above). The counter may be incremented (by 1) and/or the timer T1 may be (re)started when the PDU/SDU is received from the upper layer of the UE. The upper layer of the UE may be an SDAP entity, a PDCP entity, an RLC entity, and/or a MAC entity (corresponding to a service that supports the survival time state functionality). The counter may be incremented (by 1) and/or the timer T1 may be (re)started when the PDU/SDU is generated/obtained/multiplexed by the UE's entity. The entity may be an SDAP entity, a PDCP entity, an RLC entity, and/or a MAC entity (corresponding to a service that supports the survival time state functionality). The counter may be incremented (by 1) and/or the timer T1 may be (re)started when the PDU/SDU is submitted to the lower layer of the UE. The lower layer of the UE may be a PDCP entity, an RLC entity, a MAC entity, and/or a PHY entity (corresponding to a service that supports the service time state functionality).

In some implementations, the counter may be incremented (by 1) when a configured PUSCH in a period becomes available, and the timer T1 may be (re)started when the counter is set to 1. The counter is reset to 0 when an ACK is received and when the timer T1 is running. The UE may enter the survival time state when the timer T1 expires and when the counter is equal to a threshold.

In some implementations, the counter may be incremented (by 1) and/or the timer T1 may be (re)started when the transmitted PDU/SDU has not been transmitted before. The counter may not be incremented (by 1) and/or the timer T1 may not be (re)started when the transmitted PDU/SDU has been transmitted earlier. The counter may not be incremented (by 1) and/or the timer T1 may not be (re)started when the UE retransmits a PDU/SDU.

Condition (ii): The UE unsuccessfully transmits a PDU/SDU to the network.

Condition (ii) may be used for incrementing the counter (by 1). Condition (ii) may not be used for (re)starting the timer T1. The PDU/SDU may be a PDCP PDU/SDU, an RLC PDU/SDU, or a MAC PDU/SDU. The UE may not increment the counter due to unsuccessful transmission of a PDU/SDU if the PDU/SDU has been unsuccessfully transmitted before (e.g., the UE may only increment the counter (by 1) once for each unsuccessfully transmitted PDU). The PDU/SDU may have at least one of the characteristics (e.g., the Characteristics (i) to Characteristics (iv) as defined above). In some implementations, the PDU/SDU may have the Characteristics (iv) as defined above. The counter may be incremented (by 1) upon transmission of a PDU/SDU with at least one of the characteristics (e.g., the Characteristics (i) to Characteristics (iv) as defined above). The PDU/SDU may be considered as being unsuccessfully transmitted, by the UE, if the UE does not receive a (ACK) response for the transmitted PDU/SDU from the network for over a period. The counter may be incremented (by 1) if the UE does not receive a (ACK) response for the transmitted PDU/SDU from the network for over a period.

In some implementations, the period may be defined by a response timer/window. The response timer/window may be used for monitoring ACK from the network. Hence, the PDU/SDU may be considered being unsuccessfully transmitted, by the UE, if the response timer/window expires.

The response timer/window may be referred to as the timer cg-RetransmissionTimer, configuredGrantTimer, discardTimer, etc. The response timer/window may be configured in the same granularity as the counter, and/or the threshold (e.g., if the counter is maintained per HARQ process, the response timer/window may also be configured per HARQ process). The response timer/window that is configured for a granularity may be (re)started each time the UE performs a new transmission of a PDU/SDU, which corresponds to the granularity, to the network. The granularity may be a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), a (group of) PDU(s)/SDU(s). The response timer/window may be (re)started each time the UE receives an ACK from the network in response to a transmitted PDU/SDU. The PDU/SDU may have at least one of the specific characteristics (e.g., the Characteristics (i) to Characteristics (iv) as defined above).

The ACK may be the DCI indicating an UL grant for retransmission. The ACK may be the DFI indicating an ACK for a transmitted PDU/SDU. The response timer/window may be (re)started each time a PUSCH for transmitting a new PDU/SDU becomes available. The PDU/SDU may have at least one of the specific characteristics (e.g., the Characteristics (i) to Characteristics (iv) as defined above). The response timer/window may be (re)started each time the UE generates/obtains a PDU/SDU for new transmission. The PDU/SDU may have at least one of the specific characteristics (e.g., the Characteristics (i) to Characteristics (iv) as defined above). The response timer/window may be (re)started each time the UE performs a new transmission of a PDU/SDU. The PDU/SDU may have at least one of the specific characteristics (e.g., the Characteristics (i) to Characteristics (iv) as defined above).

In some implementations, a UE may maintain a counter for determining whether to enter the survival time state. The network may configure the UE a threshold and a response timer/window for monitoring the network's (ACK) response. The counter may be incremented (by 1) each time a UE transmits a PDU/SDU to the network and fails to receive a (ACK) response from the network for the transmitted PDU/SDU for over a period defined by the response timer/window (e.g., when the response timer/window expires). The PDU/SDU may have at least one of the specific characteristics (e.g., the Characteristics (i) to Characteristics (iv) as defined above). The counter maintained at a granularity may be incremented (by 1) when the response timer/window configured for the corresponding granularity expires. The granularity may be a (group of) HARQ process(es), a (group of) CG configuration(s), a (group of) BWP(s), a (group of) cell(s), an entity, a (group of) QoS flow(s), a (group of) LCH(s), a (group) of RLC bearer(s), a (group of) RB(s), a (group of) PDU session(s), a (group of) PDU(s).

In some implementations, the PDU/SDU may be considered as being unsuccessfully transmitted, by the UE, if the UE receives a NACK in response to the transmitted PDU/SDU from the network. The counter may be incremented (by 1) if the UE receives a NACK in response to the transmitted PDU/SDU from the network. The network may indicate a NACK to the UE in response to the PDU/SDU transmitted by the UE via an UL grant. The UL grant (e.g., DCI) may schedule an PUSCH for retransmission of the PDU/SDU. The UL grant may have the same HARQ process ID as the transmitted PDU/SDU. The UL grant may be associated with a C-RNTI, a CS-RNTI, an MCS-C-RNTI, a UE-specific type of RNTI etc. The PDU/SDU may be referred to as a MAC PDU/SDU. The network may indicate a NACK to the UE in response to the PDU/SDU transmitted by the UE via the DFI. The DFI may indicate the same HARQ process ID as the transmitted PDU/SDU. The network may indicate a NACK to the UE in response to the PDU/SDU transmitted by the UE via a PDCP status report. The network may indicate a NACK to the UE in response to the PDU/SDU transmitted by the UE via an RLC status PDU. A UE may maintain a counter for determining whether to enter the survival time state. Consequently, the counter may be incremented (by 1) each time a UE transmits a PDU/SDU to the network and receives a NACK from the network in response to the transmitted PDU/SDU. The PDU/SDU may have at least one of the characteristics (e.g., the Characteristics (i) to Characteristics (iv) as defined above).

In some implementations, the PDU/SDU may be considered as being unsuccessfully transmitted, by the UE, when a PUSCH for retransmission arrives. The PUSCH for retransmission may be scheduled by the network via an UL grant (e.g., DCI). The PUSCH may be specifically used for transmitting a PDU/SDU with at least one of the characteristics (e.g., the Characteristics (i) to Characteristics (iv) as defined above). The PUSCH may be from a default CG configuration and/or a special CG configuration. A UE may maintain a counter for determining whether to enter the survival time state. The counter may be incremented (by 1) when the UE obtains the PDU/SDU from a buffer for retransmission. The buffer may be a PDCP transmission buffer, an RLC transmission buffer, a HARQ buffer, etc. The buffer may already be stored with a PDU/SDU. The PDU/SDU may have at least one of the characteristics (e.g., the Characteristics (i) to Characteristics (iv) as defined above).

The counter may be incremented (by 1) only if the UE obtains the PDU/SDU, which has at least one of the characteristics (e.g., the Characteristics (i) to Characteristics (iv) as defined above), for retransmission.

Condition (iii): The UE discards a PDU/SDU.

The PDU/SDU may be a PDCP PDU/SDU, an RLC PDU/SDU, a MAC PDU/SDU, etc. The PDU/SDU may have at least one of the characteristics (e.g., the Characteristics (i) to Characteristics (iv) as defined above). The counter may be incremented (by 1) and/or the timer T1 may be (re)started only if the UE discards the PDU/SDU with at least one of the characteristics (e.g., the Characteristics (i) to Characteristics (iv) as defined above). The PDU/SDU may be discarded upon expiration of a timer discardTimer associated with the PDU/SDU. The timer discardTimer may be (re)started when the UE receives a SDU from the upper layer (e.g., from the SDAP layer). That is to say, the counter may be incremented (by 1) and/or the timer T1 may be (re)started when the timer discardTimer for the PDU/SDU expires. The counter and/or the timer T1 may correspond to the PDU/SDU.

Condition (iv): The UE flushes a buffer for storing a PDU/SDU.

The PDU/SDU may be a PDCP PDU/SDU, RLC PDU/SDU, MAC PDU/SDU, etc.

The buffer may be a PDCP transmission buffer, an RLC transmission buffer, a HARQ buffer, etc. The PDU/SDU may have at least one of the characteristics (e.g., the Characteristics (i) to Characteristics (iv) as defined above). The counter may be incremented (by 1) and/or the timer T1 may be (re)started only if the buffer for the PDU/SDU with at least one of the characteristics (e.g., the Characteristics (i) to Characteristics (iv) as defined above) is flushed. The counter and/or the timer T1 may correspond to the PDU/SDU. The counter and/or the timer T1 may correspond to the same granularity as the PDU/SDU. The granularity may be a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), a (group of) PDU(s).

Condition (v): The channel condition is bad.

When the channel condition is bad, the UE may enter the survival time state because the UE may have less opportunity to successfully transmit the UL data to the network on the current active BWP/cell/cell group. In this case, the UE may need to rely on the network for changing the UE's BWP/cell/cell group before starting/resuming a URLLC service. The UE may consider a bad channel condition if the UE detects an RLF. The RLF may be detected in a serving cell (e.g., a SpCell and/or a SCell). When a cell (that corresponds to a service) detects an RLF, the UE may reset (e.g., set to 0) a counter and/or re(start)/stop the timer T1 (that is maintained at the cell/service). The UE may consider a bad channel condition if the UE detects a BFR. The BFR may be detected in a cell (e.g., a SpCell and/or a SCell). When a cell (that corresponds to a service) detects an BFR, the UE may reset (e.g., set to 0) a counter and/or re(start)/stop timer T1 (that is maintained at the cell/service). The UE may consider a bad channel condition if it detects consistent LBT failure. Consistent LBT failure may be detected in a cell (e.g., a SpCell and/or a SCell). When consistent LBT failure is detected (at a cell), the UE may trigger consistent LBT failure (at the cell). When a cell (that corresponds to a service) detects consistent LBT failure, the UE may reset (e.g., set to 0) a counter and/or re(start)/stop the timer T1 (that is maintained at the cell/service).

In some implementations, the counter may be reset (e.g., set to 0) and/or the timer T1 may be (re)started/stopped when at least one of the following conditions (e.g., Condition (a) to condition (h)) is satisfied.

Condition (a): The UE successfully transmits a PDU/SDU to the network.

The PDU/SDU may be a PDCP, RLC, or MAC PDU/SDU.

The PDU/SDU may have at least one of the characteristics (as defined above). As such, the counter may be reset (i.e., set to 0) and/or T1 may be (re)started/stopped only upon transmission of a PDU/SDU with at least one of the characteristics defined above.

The PDU/SDU may be considered as being successfully transmitted, by the UE, if the UE does not receive a (NACK) response for the transmitted PDU/SDU from the network for over a period. As such, the counter may be reset (i.e., set to 0) and/or T1 may be (re)started/stopped if the UE does not receive a (NACK) response for the transmitted PDU/SDU from the network for over a period.

In some implementations, the period may be defined by a response timer/window. The response timer/window may be used for monitoring NACK from the network. The PDU/SDU may be considered being successfully transmitted, by the UE, if the response timer/window expires.

The response timer/window may be referred to as the timer configuredGrantTimer, the timer discardTimer, etc. The response timer/window may be configured in the same granularity as the counter, the timer T1, and/or the threshold (e.g., if the counter is maintained per HARQ process, the response timer/window or the timer T1 may also be configured per HARQ process). The response timer/window that is configured for a granularity may be (re)started each time the UE transmits a PDU/SDU, which corresponds to the granularity, to the network. The granularity may be a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU/SDU session(s), a (group of) PDU(s)/SDU(s).

The response timer/window may be (re)started each time the UE receives a NACK from the network in response to a transmitted PDU/SDU. The PDU/SDU may have at least one of the specific characteristics (e.g., the Characteristics (i) to Characteristics (iv) as defined above). The NACK may be the DCI indicating an UL grant for retransmission. The NACK may be a DFI indicating a NACK for a transmitted PDU/SDU. The response timer/window may be (re)started each time a PUSCH for retransmitting a PDU/SDU becomes available. The PDU/SDU may have at least one of the specific characteristics (e.g., the Characteristics (i) to Characteristics (iv) as defined above). The response timer/window may be (re)started each time the UE obtains a PDU/SDU for retransmission from the transmission buffer. The PDU/SDU may have at least one of the specific characteristics (e.g., the Characteristics (i) to Characteristics (iv) as defined above). The response timer/window may be (re)started each time the UE retransmits a PDU/SDU. The PDU/SDU may have at least one of the specific characteristics (e.g., the Characteristics (i) to Characteristics (iv) as defined above).

In some implementations, a UE may maintain a counter and/or may be configured with a timer T1 for determining whether to enter the survival time state. The network may configure the UE a threshold and a response timer/window. The counter may be incremented (by 1) and/or the timer T1 may be (re)started each time a UE transmits a PDU/SDU to the network. The counter may be reset (e.g., set to 0) and/or the timer T1 may be (re)started/stopped when a response timer/window for monitoring NACK (e.g., the timer configuredGrantTimer) expires.

The PDU/SDU may have at least one of the characteristics (e.g., the Characteristics (i) to Characteristics (iv) as defined above). The counter maintained at a granularity may be reset (i.e., set to 0) when a timer/window configured for the corresponding granularity expires. The granularity may be a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), a (group of) PDU(s). The timer T1 configured for a granularity may be (re)started/stopped when a timer/window configured for the corresponding granularity expires. The granularity may be a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), a (group of) PDU(s).

In some implementations, the PDU/SDU may be considered as being successfully transmitted, by the UE, if the UE receives a ACK in response to the transmitted PDU/SDU from the network. The counter may be reset (i.e., set to 0) and/or the timer T1 may be (re)started/stopped if the UE receives an ACK in response to the transmitted PDU/SDU from the network.

The network may indicate a ACK to the UE in response to the PDU/SDU transmitted by the UE via an UL grant. The UL grant may schedule an PUSCH for new transmission. The UL grant may have the same HARQ process ID as the transmitted PDU/SDU. The UL grant may be associated with a C-RNTI or a CS-RNTI. The PDU/SDU may be referred to as a MAC PDU/SDU. The network may indicate an ACK to the UE in response to the PDU/SDU transmitted by the UE via an DFI. The DFI may indicate the same HARQ process ID as the transmitted PDU/SDU. The network may indicate an ACK to the UE in response to the PDU/SDU transmitted by the UE via a PDCP status report. The network may indicate a ACK to the UE in response to the PDU/SDU transmitted by the UE via an RLC status PDU. A UE may maintain a counter and/or may be configured with a timer T1 for determining whether to enter the survival time state. The counter may be incremented (by 1) and/or the timer T1 may be (re)started each time a UE transmits a PDU/SDU to the network. The counter may be reset (i.e., set to 0) and/or the timer T1 may be (re)started/stopped when the UE receives an ACK from the network in response to the transmitted PDU/SDU. The PDU/SDU may have at least one of the characteristics (e.g., the Characteristics (i) to Characteristics (iv) as defined above).

In some implementations, when the PDU/SDU is considered as being successfully transmitted, the UE may discard the corresponding PDU/SDU. The counter may be reset (e.g., set to 0) and/or the timer T1 may be (re)started/stopped upon discarding the PDU/SDU.

Condition (b): A service where the counter is maintained and/or a service where the timer T1 is configured at is reconfigured.

The counter may be considered as being maintained at the service if the counter is maintained at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service. The timer T1 may be considered as being configured at the service if the timer T1 is configured at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service.

The service may be considered as being reconfigured if at least one parameter in a configuration that configures a (group of) DRB(s) (e.g., a configuration used to add, modify, and release signaling and/or data radio bearers) that corresponds to the service is reconfigured. The service may be considered as being reconfigured if at least one parameter in a configuration that configures a (group of) LCH(s) (e.g., a configuration used to configure the logical channel parameters) that corresponds to the service is reconfigured. The service may be considered as being reconfigured if at least one parameter in a configuration that configures a (group of) CG(s) (e.g., ConfiguredGrantConfig IE) that corresponds to the service is reconfigured. The service may be considered as being reconfigured if at least one parameter in a configuration that configures an entity (e.g., a configuration used to configure an RLC entity, a PDCP entity, an SDAP entity, etc.) that corresponds to the service is reconfigured. The service may be considered as being reconfigured if at least one parameter in a configuration that configures a BWP/Cell (e.g., a configuration used to configure a BWP, a configuration used to configure cell, etc.) that corresponds to the service is reconfigured.

Condition (c): A buffer (that corresponds to a service) where the counter is maintained and/or a buffer (that corresponds to a service) where the timer T1 is configured at is flushed.

The buffer may be a PDCP transmission buffer, an RLC transmission buffer, a HARQ buffer, etc. The buffer may be considered as being corresponded to the service if the buffer associates with an entity that corresponds to the service. The entity may be an SDAP entity, a PDCP entity, an RLC entity, etc. The buffer may be considered as being corresponded to the service if buffer corresponds to an HARQ ID and the HARQ ID corresponds to the service. The counter may be considered as being maintained at the service if the counter is maintained at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service. The timer T1 may be considered as being configured at the service if the timer T1 is configured at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service.

Condition (d): An entity (that corresponds to a service) where the counter is maintained and/or an entity (that corresponds to a service) where the timer T1 is configured at is re-established/reset/released/suspended.

The entity may be an SDAP entity, a PDCP entity, an RLC entity, and or a MAC entity. The service may support the survival time state functionality.

Condition (e): A CG configuration (that corresponds to a service) where the counter is maintained and/or a CG configuration (that corresponds to a service) where the timer T1 is configured at is cleared/suspended/deactivated (by the network).

The CG configuration may be considered as being corresponded to the service if it can be used for transmitting data from a LCH that corresponds to the service (e.g., the data from the LCH can be mapped to the CG configuration (via allowedCG-List)). The CG configuration may be a default CG configuration and/or a special CG configuration. The CG configuration may be deactivated by a deactivation command (e.g., a DCI indicating a configured grant Type 2 deactivation). The CG configuration may be suspended if a cell/BWP where the CG configuration corresponds to is deactivated.

Condition (f): A BWP/cell/cell group (that corresponds to a service) where the counter is maintained and/or a BWP/cell/cell group (that corresponds to a service) where the timer T1 is configured at is deactivated/released.

The cell may be considered as being corresponded to the service if it is configured for the service. The BWP/cell/cell group may be considered as being corresponded to the service if it can be used for transmitting data from a LCH that corresponds to the service, e.g., the data from the LCH can be mapped to the BWP/cell/cell group. A cell group may be a MCG or a SCG.

Condition (g): The channel condition is bad.

When the channel condition is bad, the UE may not need to enter survival time state because the UE may have less opportunity to successfully transmit the UL data to the network on the current active BWP/cell/cell group. In this case, the UE may need to rely on the network for changing the UE's BWP/cell/cell group before starting/resuming a URLLC service.

The UE may consider a bad channel condition if the UE detects an RLF. The RLF may be detected in a serving cell (e.g., a SpCell and/or a SCell). When a cell (that corresponds to a service) detects an RLF, the UE may reset (i.e., set to 0) a counter and/or re(start)/stop the timer T1 that is maintained at the cell/service.

The UE may consider a bad channel condition if the UE detects a BFR. The BFR may be detected in a cell (e.g., a SpCell and/or a SCell). When a cell (that corresponds to a service) detects an BFR, the UE may reset (e.g., set to 0) a counter and/or re(start)/stop the timer T1 that is maintained at the cell/service.

The UE may consider a bad channel condition if it detects consistent LBT failure. Consistent LBT failure may be detected in a cell (e.g., a SpCell and/or a SCell). When consistent LBT failure is detected (at a cell), the UE may trigger consistent LBT failure (at the cell). When a cell (that corresponds to a service) detects consistent LBT failure, the UE may reset (i.e., set to 0) a counter and/or re(start)/stop the timer T1 that is maintained at the cell/service.

Condition (h): The UE enters the survival time state.

The UE may reset the counter and/or re(start)/stop the timer T1 if (any service of) the UE enters the survival time state. The UE may reset the counter and/or (re)start/stop the timer T1 that is maintained/configured at a service if the service of the UE enters the survival time state. The counter may be considered as being maintained at the service if the counter is maintained at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service. The timer T1 may be considered as being configured at the service if the timer T1 is configured at a (group of) HARQ process(es), a (group of) CG configuration(s), a (group of) BWP(s), a (group of) cell(s), an entity, a (group of) QoS flow(s), a (group of) LCH(s), a (group of) RB(s), a (group of) PDU session(s), and/or a (group of) PDU(s) that correspond to the service. The UE may reset the counter and/or (re)start/stop the timer T1 that is maintained/configured for a BWP/cell/cell group if a service that may be transmitted on the corresponding BWP/cell/cell group enters the survival time state.

Figure 7:
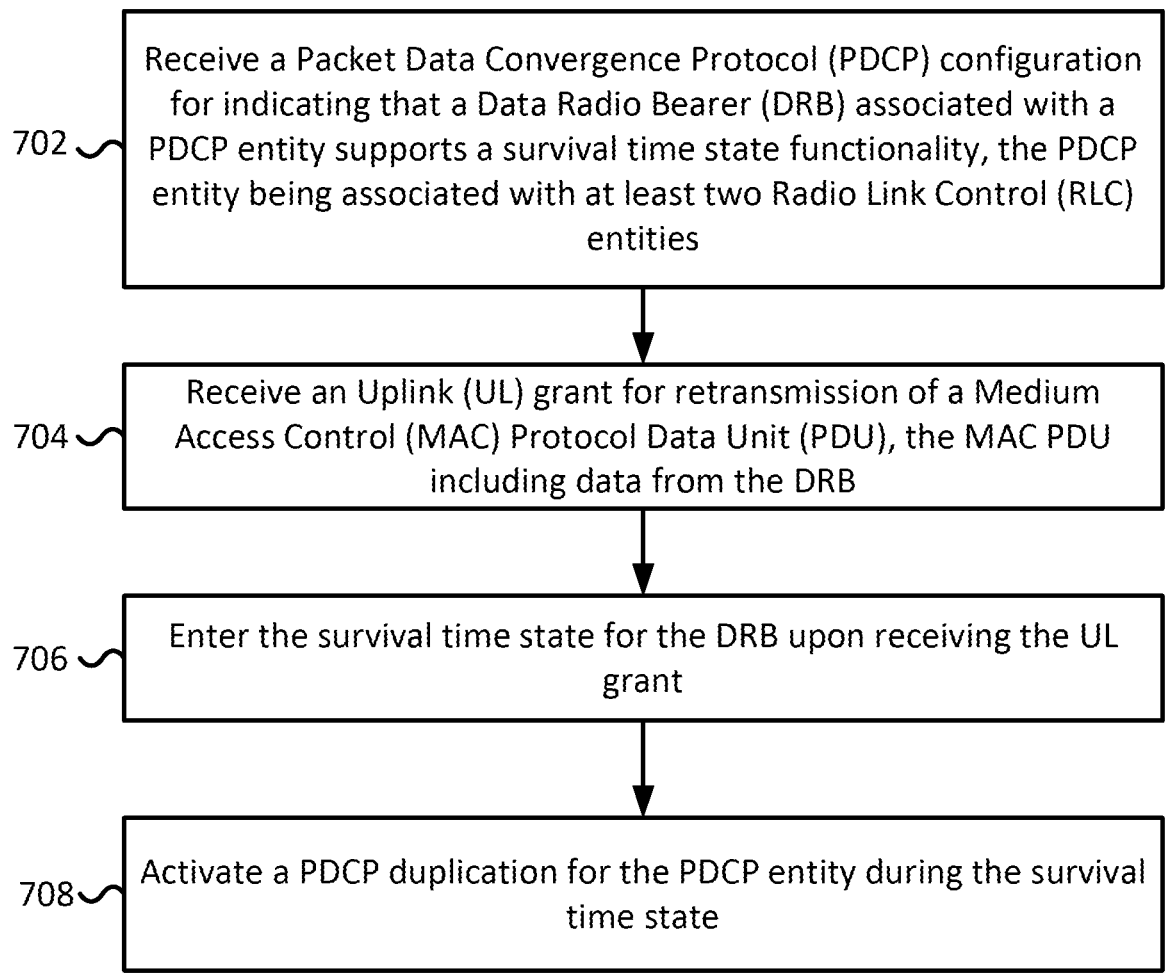
FIG. 7 is a flowchart diagram illustrating a method for a UE for handling a survival time state according to an example implementation of the present disclosure.

FIG. 7 is a flowchart diagram illustrating a method 700 for a UE for handling a survival time state according to an example implementation of the present disclosure. Although actions 702, 704, 706, and 708 are illustrated as separate actions represented as independent blocks in FIG. 7, these separately illustrated actions should not be construed as necessarily order-dependent. The order in which the actions are performed in FIG. 7 is not intended to be construed as a limitation, and any number of the disclosed blocks may be combined in any order to implement the method, or an alternate method. Moreover, each of actions 702, 704, 706, and 708 may be performed independently of other actions and can be omitted in some implementations of the present disclosure.

In action 702, the UE may receive a PDCP configuration for indicating that a DRB associated with a PDCP entity supports a survival time state functionality. The PDCP entity may be associated with at least two RLC entities. A service may be mapped to the DRB. The service that supports the survival time state functionality may be mapped to a DRB ID of the DRB. The network may indicate that the DRB ID supports the survival time state functionality to the UE. The PDCP configuration may be a PDCP-Config IE or a survival-PDCP-Config IE.

In some implementations, the PDCP configuration may include an indication indicating that the DRB associated with the PDCP entity supports the survival time state functionality, and the indication may be an enumerate format.

In action 704, the UE may receive a UL grant for retransmission of a MAC PDU. The MAC PDU may include data from the DRB.

The MAC PDU may be determined as being unsuccessfully transmitted by the UE if the UE receives a NACK in response to the transmitted MAC PDU from the network. The network may indicate the NACK to the UE via an UL grant in response to the MAC PDU transmitted by the UE. The UL grant (e.g., DCI) may schedule an PUSCH for retransmission of the MAC PDU.

In some implementations, the UL grant may be associated with a Configured Scheduling-Radio Network Temporary Identifier (CS-RNTI). In some implementations, the UL grant may include a Hybrid Automatic Repeat Request (HARQ) process ID of a HARQ process, and the MAC PDU may be stored in a HARQ process buffer of the HARQ process. The UL grant may have the same HARQ process ID as the MAC PDU transmitted by the UE.

In action 706, the UE may enter the survival time state for the DRB upon receiving the UL grant.

In action 708, the UE may activate a PDCP duplication for the PDCP entity during the survival time state.

In some implementations, after the UE activates the PDCP duplication for the PDCP entity, the UE may duplicate PDCP data PDU and send the duplicated PDCP data PDU from the PDCP entity to each of the at least two RLC entities.

In the present disclosure, by allowing the configuration of the survival time state functionality to a DRB of a service and by allowing the corresponding service to enter the survival time state, the reliability of the corresponding service may be improved via the activation of PDCP duplication when the data of the corresponding service is not successfully received by the network. Here, the UE may determine the data of the service to be unsuccessfully received by the network upon reception of an UL scheduling for retransmission of data for the corresponding service. Since the activation of the PDCP duplication is performed by the PDCP entity of the DRB, the configuration of the survival time state functionality may be configured in the PDCP entity of the DRB for better handling of this function.

Figure 8:
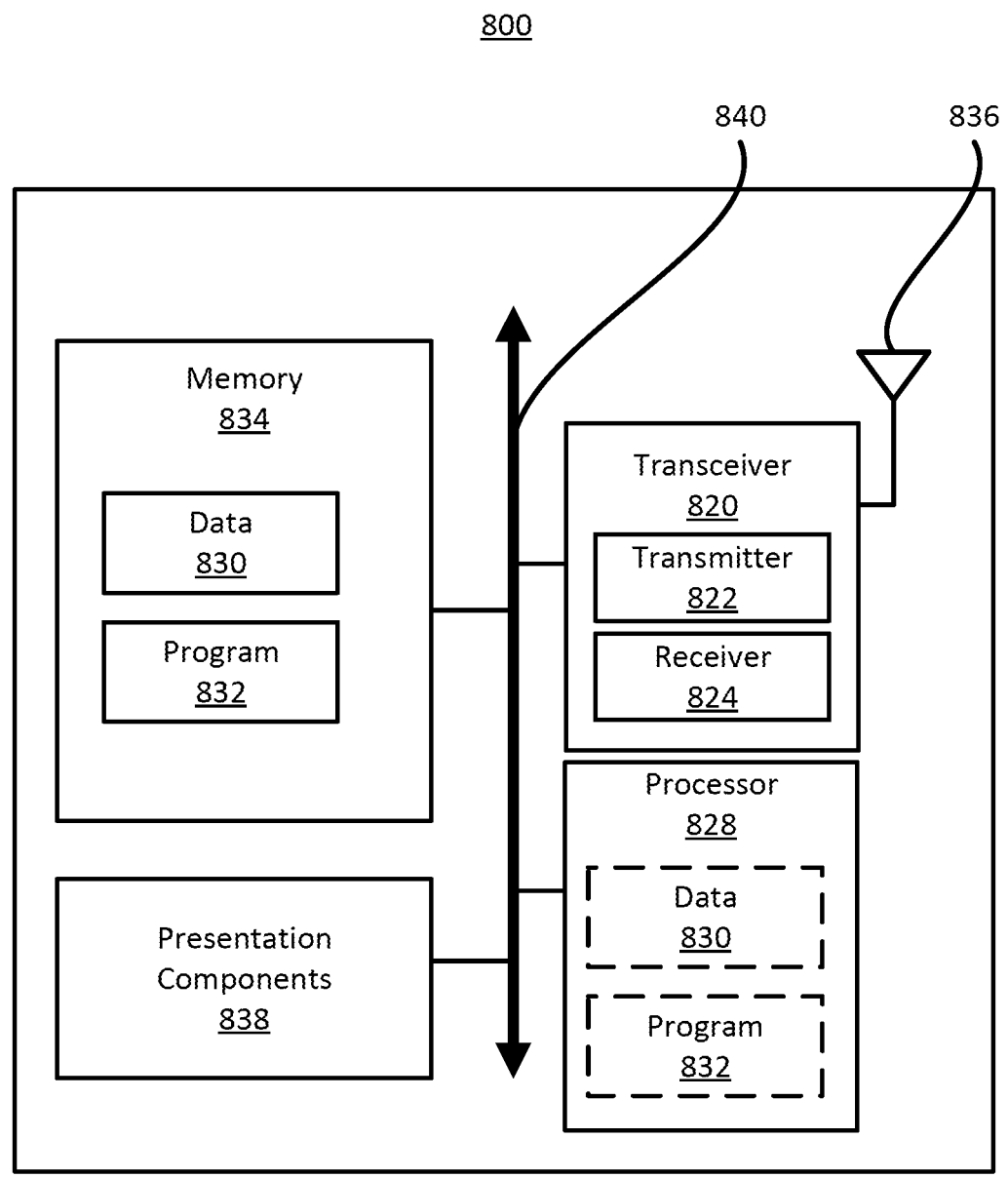
FIG. 8 is a block diagram illustrating a node for wireless communication according to an example implementation of the present disclosure.

FIG. 8 is a block diagram illustrating a node 800 for wireless communication according to an example implementation of the present disclosure. As illustrated in FIG. 8, a node 800 may include a transceiver 820, a processor 828, a memory 834, one or more presentation components 838, and at least one antenna 836. The node 800 may also include a radio frequency (RF) spectrum band module, a BS communications module, a network communications module, and a system communications management module, Input/Output (I/O) ports, I/O components, and a power supply (not illustrated in FIG. 8).

Each of the components may directly or indirectly communicate with each other over one or more buses 840. The node 800 may be a UE or a BS that performs various functions disclosed with reference to FIGS. 1-7.

The transceiver 820 has a transmitter 822 (e.g., transmitting/transmission circuitry) and a receiver 824 (e.g., receiving/reception circuitry) and may be configured to transmit and/or receive time and/or frequency resource partitioning information. The transceiver 820 may be configured to transmit in different types of subframes and slots including but not limited to usable, non-usable, and flexibly usable subframes and slot formats. The transceiver 820 may be configured to receive data and control channels.

The node 800 may include a variety of computer-readable media. Computer-readable media may be any available media that may be accessed by the node 800 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the previously listed components should also be included within the scope of computer-readable media.

The memory 834 may include computer-storage media in the form of volatile and/or non-volatile memory. The memory 834 may be removable, non-removable, or a combination thereof. Example memory may include solid-state memory, hard drives, optical-disc drives, etc. As illustrated in FIG. 8, the memory 834 may store a computer-readable and/or computer-executable program 832 (e.g., software codes) that are configured to, when executed, cause the processor 828 to perform various functions disclosed herein, for example, with reference to FIG. 7. Alternatively, the program 832 may not be directly executable by the processor 828 but may be configured to cause the node 800 (e.g., when compiled and executed) to perform various functions disclosed herein.

The processor 828 (e.g., having processing circuitry) may include an intelligent hardware device (e.g., a Central Processing Unit (CPU), a microcontroller, an ASIC, etc). The processor 828 may include memory. The processor 828 may process the data 830 and the program 832 received from the memory 834, and information transmitted and received via the transceiver 820, the base band communications module, and/or the network communications module. The processor 828 may also process information to send to the transceiver 820 for transmission via the antenna 836 to the network communications module for transmission to a CN.

One or more presentation components 838 may present data indications to a person or another device. Examples of presentation components 838 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for handling a survival time state, the method comprising:
   receiving, from a base station, a Packet Data Convergence Protocol (PDCP) configuration;
   determining whether an indication is included in the PDCP configuration;
   determining that a Data Radio Bearer (DRB) associated with a PDCP entity supports a survival time state functionality in a case that the indication is included in the PDCP configuration and indicates a specific value, wherein the PDCP entity is associated with at least two Radio Link Control (RLC) entities;
   determining that the DRB associated with the PDCP entity does not support the survival time state functionality in a case that the indication is absent from the PDCP configuration;
   receiving an Uplink (UL) grant for retransmission of a Medium Access Control (MAC) Protocol Data Unit (PDU), the MAC PDU including data from the DRB;
   entering the survival time state for the DRB upon receiving the UL grant in a case that a counter value of a counter for counting a number of unsuccessful data transmissions is equal to a threshold; and
   activating a PDCP duplication for the PDCP entity while the UE is in the survival time state.

2. The method of claim 1, wherein
   the indication is in an enumerate format.

3. The method of claim 1, wherein the UL grant is associated with a Configured Scheduling-Radio Network Temporary Identifier (CS-RNTI).

4. The method of claim 1, further comprising:
after activating the PDCP duplication for the PDCP entity:
  duplicating a PDCP PDU; and
  sending the duplicated PDCP PDU from the PDCP entity to each of the at least two RLC entities.

5. The method of claim 1, wherein:
the UL grant includes a Hybrid Automatic Repeat Request (HARQ) process identifier (ID) of a HARQ process, and
the MAC PDU is stored in a HARQ process buffer of the HARQ process.

6. A User Equipment (UE) for handling a survival time state, the UE comprising:
at least one non-transitory computer-readable medium storing one or more computer-executable instructions; and
at least one processor coupled to the at least one non-transitory computer-readable medium and configured to execute the one or more computer-executable instructions to cause the UE to:
  receive, from a base station, a Packet Data Convergence Protocol (PDCP) configuration;
  determine whether an indication is included in the PDCP configuration;
  determine that a Data Radio Bearer (DRB) associated with a PDCP entity supports a survival time state functionality in a case that the indication is included in the PDCP configuration and indicates a specific value, wherein the PDCP entity is associated with at least two Radio Link Control (RLC) entities;
  determine that the DRB associated with the PDCP entity does not support the survival time state functionality in a case that the indication is absent from the PDCP configuration;
  receive an Uplink (UL) grant for retransmission of a Medium Access Control (MAC) Protocol Data Unit (PDU), the MAC PDU including data from the DRB;
  enter the survival time state for the DRB upon receiving the UL grant in a case that a counter value of a counter for counting a number of unsuccessful data transmissions is equal to a threshold; and
  activate a PDCP duplication for the PDCP entity while the UE is in the survival time state.

7. The UE of claim 6, wherein
the indication is in an enumerate format.

8. The UE of claim 6, wherein the UL grant is associated with a Configured Scheduling-Radio Network Temporary Identifier (CS-RNTI).

9. The UE of claim 6, wherein the one or more computer-executable instructions, when executed by the at least one processor, further cause the UE to:
after activating the PDCP duplication for the PDCP entity:
  duplicate a PDCP PDU; and
  send the duplicated PDCP PDU from the PDCP entity to each of the at least two RLC entities.

10. The UE of claim 6, wherein:
the UL grant includes a Hybrid Automatic Repeat Request (HARQ) process identifier (ID) of a HARQ process, and
the MAC PDU is stored in a HARQ process buffer of the HARQ process.

* * * * *